(12) United States Patent
Murdock et al.

(10) Patent No.: US 9,529,822 B2
(45) Date of Patent: Dec. 27, 2016

(54) MEDIA OR CONTENT TAGGING DETERMINED BY USER CREDIBILITY SIGNALS

(75) Inventors: Vanessa Murdock, Catalunya (ES); Roelof van Zwol, Sunnyvale, CA (US); Emmanouil Papangelis, Toronto (CA)

(73) Assignee: Yahoo! Inc., Sunnyvale, CA (US)

( * ) Notice: Subject to any disclaimer, the term of this patent is extended or adjusted under 35 U.S.C. 154(b) by 707 days.

(21) Appl. No.: 12/898,654

(22) Filed: Oct. 5, 2010

(65) Prior Publication Data
US 2012/0084302 A1    Apr. 5, 2012

(51) Int. Cl.
*G06F 17/30*    (2006.01)

(52) U.S. Cl.
CPC .............. *G06F 17/30241* (2013.01)

(58) Field of Classification Search
USPC ............ 707/665, 668, 673, 688, 706, 709, 710,707/711, 723, 727, 728, 730, 731, 736, 737,707/741, 748–754, 770, 776, 781
See application file for complete search history.

(56) References Cited

U.S. PATENT DOCUMENTS

| | | | |
|---|---|---|---|
| 6,078,740 A | 6/2000 | DeTreville | |
| 6,687,696 B2 | 2/2004 | Hofmann et al. | |
| 7,505,959 B2 | 3/2009 | Kaiser et al. | |
| 8,094,948 B2 | 1/2012 | Jain et al. | |
| 8,352,467 B1 | 1/2013 | Guha | |
| 8,385,591 B1 * | 2/2013 | Anguelov | G06T 11/003 340/988 |
| 8,782,680 B2 | 7/2014 | Cook et al. | |
| 9,137,574 B2 | 9/2015 | Rae et al. | |
| 2002/0083459 A1 | 6/2002 | Kondo et al. | |
| 2002/0087987 A1 | 7/2002 | Dudkiewicz et al. | |
| 2002/0120609 A1 * | 8/2002 | Lang et al. | 707/1 |
| 2004/0249713 A1 | 12/2004 | Gross | |
| 2005/0159970 A1 | 7/2005 | Buyukkokten et al. | |
| 2006/0031217 A1 | 2/2006 | Smith et al. | |
| 2006/0038817 A1 * | 2/2006 | Langer | G06T 15/04 345/426 |
| 2007/0115373 A1 * | 5/2007 | Gallagher et al. | 348/231.3 |
| 2007/0230914 A1 | 10/2007 | Garrido et al. | |
| 2008/0033776 A1 | 2/2008 | Marchese | |
| 2008/0115083 A1 * | 5/2008 | Finkelstein | G06F 17/30 715/805 |
| 2008/0120310 A1 * | 5/2008 | Khoury | 707/100 |
| 2008/0132252 A1 * | 6/2008 | Altman et al. | 455/457 |
| 2008/0162260 A1 | 7/2008 | Rohan et al. | |
| 2008/0195657 A1 * | 8/2008 | Naaman | G06K 9/00677 707/999.107 |
| 2009/0044235 A1 * | 2/2009 | Davidson | 725/87 |

(Continued)

FOREIGN PATENT DOCUMENTS

FR    WO2011148222    1/2011

OTHER PUBLICATIONS

Pedro, et al, "Ranking and Classifying Attractiveness of Photos in Folksonomies", WWW 2009 MADRIDI, Apr. 20-24, 2009 Madrid, Spain, pp. 771-780.

(Continued)

*Primary Examiner* — Khanh Pham
(74) *Attorney, Agent, or Firm* — Berkeley Law & Technology Group, LLP

(57) ABSTRACT

Briefly, one or more embodiments of methods, apparatuses or systems for media or content tagging are described.

17 Claims, 14 Drawing Sheets

(56) References Cited

U.S. PATENT DOCUMENTS

| | | | |
|---|---|---|---|
| 2009/0089322 A1* | 4/2009 | Naaman | G06F 17/30038 707/999.103 |
| 2009/0113480 A1 | 4/2009 | Allard et al. | |
| 2009/0172030 A1 | 7/2009 | Schiff et al. | |
| 2009/0327168 A1 | 12/2009 | Weinberger et al. | |
| 2010/0145777 A1 | 6/2010 | Ghosh et al. | |
| 2010/0145958 A1* | 6/2010 | Duffy et al. | 707/755 |
| 2010/0205541 A1* | 8/2010 | Rapaport et al. | 715/753 |
| 2010/0228631 A1 | 9/2010 | Zhang et al. | |
| 2010/0257183 A1* | 10/2010 | Kim et al. | 707/748 |
| 2010/0262550 A1 | 10/2010 | Burritt et al. | |
| 2010/0268574 A1 | 10/2010 | Butcher et al. | |
| 2011/0035284 A1 | 2/2011 | Moshfeghi | |
| 2011/0040592 A1 | 2/2011 | Kurtzig | |
| 2011/0078775 A1* | 3/2011 | Yan | 726/6 |
| 2011/0280447 A1* | 11/2011 | Conwell | G06F 17/30265 382/103 |
| 2011/0320373 A1 | 12/2011 | Lee | |
| 2012/0179552 A1 | 7/2012 | Tishkevich | |
| 2013/0326338 A1* | 12/2013 | Secord | G06F 17/30268 715/243 |

OTHER PUBLICATIONS

Konstas, et al, "On Social Networks and Collaborative Recommendation", SIGIR 2009, Jul. 19-23, 2009, Boston, MA., Copyright 2009, pp. 195-202.

Zheng, et al, "A Regression Framework for Learning Ranking Functions Using Relative Relevance Judgments", SIGIR 2007, Jul. 23-27, 2007, Amsterdam, Netherlands, Copyright 2007, pp. 287-294.

Application as filed, filed on Jul. 28, 2010 (U.S. Appl. No. 12/845,684), 59 pages.

Filing receipt mailed Aug. 12, 2010 for U.S. Appl. No. 12/845,648, 3 pages.

Application as filed, filed on Oct. 5, 2010 (U.S. Appl. No. 12/898,644), 67 pages.

Filing receipt mailed Oct. 21, 2010 for U.S. Appl. No. 12/898,644, 3 pages.

Application as filed, filed on Oct. 5, 2010 (U.S. Appl. No. 12/898,661), 71 pages.

Notice to file corrected application papers mailed Oct. 20, 2010 for U.S. Appl. No. 12/898,661, 2 pages.

Filing receipt mailed Oct. 20, 2010 for U.S. Appl. No. 12/898,661, 3 pages.

U.S. Appl. No. 12/845,684; Notice of Publication, mailed Feb. 2, 2012, 1 page.

U.S. Appl. No. 12/845,684; Examiner Search, mailed Jun. 7, 2012, 2 pages.

U.S. Appl. No. 12/845,684; Examiner Search, mailed Jun. 13, 2012, 2 pages.

U.S. Appl. No. 12/845,684; Non-Final Rejection and Examiner Search, mailed Jun. 20, 2012, 20 pages.

U.S. Appl. No. 12/845,684; Amendment/Req Reconsideration, filed Sep. 20, 2012, 24 pages.

U.S. Appl. No. 12/845,684; Final Rejection and Examiner Search, mailed Nov. 13, 2012, 14 pages.

U.S. Appl. No. 12/845,684; RCE and Amendments, filed Jan. 31, 2013, 18 pages.

U.S. Appl. No. 12/845,684; Non-Final Rejection and Examiner Search, mailed May 19, 2014, 21 pages.

U.S. Appl. No. 12/845,684; Amendment Req/Reconsideration, filed Aug. 19, 2014, 17 pages.

U.S. Appl. No. 12/845,684; Final Rejection and Examiner Search, mailed Sep. 12, 2014, 15 pages.

U.S. Appl. No. 12/845,684; Response after Final, filed Nov. 12, 2014, 29 pages.

U.S. Appl. No. 12/845,684; Advisory Action, mailed Nov. 24, 2014, 3 pages.

U.S. Appl. No. 12/845,684; RCE and Amendments, filed Dec. 12, 2014, 20 pages.

U.S. Appl. No. 12/898,644; Notice of Publication, mailed Apr. 5, 2012, 1 page.

U.S. Appl. No. 12/898,644; Examiner Search, mailed Jun. 11, 2012, 1 page.

U.S. Appl. No. 12/898,644; Requirement for Restriction/Election, mailed Jul. 11, 2012, 8 pages.

U.S. Appl. No. 12/898,644; Response to Election/Restriction, filed Aug. 1, 2012, 13 pages.

U.S. Appl. No. 12/898,644; Non-Final Rejection and Examiner Search, mailed Sep. 5, 2012, 21 pages.

U.S. Appl. No. 12/898,644; Amendment/Req Reconsideration, filed Dec. 5, 2012, 12 pages.

U.S. Appl. No. 12/898,644; Final Rejection, mailed Feb. 13, 2013, 15 pages.

U.S. Appl. No. 12/898,644; Response after Final, filed Mar. 7, 2013, 16 pages.

U.S. Appl. No. 12/898,644; Advisory Action, mailed Apr. 10, 2013, 3 pages.

U.S. Appl. No. 12/898,644; RCE, filed May 13, 2013, 16 pages.

U.S. Appl. No. 12/898,644; Non-Final Rejection, mailed May 28, 2013, 14 pages.

U.S. Appl. No. 12/898,644; Amendment/Req Reconsideration after Non-Final, filed Aug. 26, 2013, 16 pages.

U.S. Appl. No. 12/898,644; Final Rejection, mailed Sep. 24, 2013, 27 pages.

U.S. Appl. No. 12/898,644; Response after Final, filed Nov. 25, 2013, 16 pages.

U.S. Appl. No. 12/898,644; RCE and Amendments, filed Mar. 20, 2014, 21 pages.

U.S. Appl. No. 12/898,644; Non-Final Rejection and Examiner Search, mailed Apr. 29, 2014, 42 pages.

U.S. Appl. No. 12/898,644; Amendment/Req for Reconsideration, filed Jul. 29, 2014, 17 pages.

U.S. Appl. No. 12/898,644; Examiner Search, Jan. 26, 2015, 1 page.

U.S. Appl. No. 12/898,644; Non-Final Rejection and Examiner Search, mailed Jan. 28, 2015, 13 pages.

U.S. Appl. No. 12/898,661 / Applicant Response to Pre-Exam Exam Formalities Notice, filed Dec. 7, 2010, 8 pages.

U.S. Appl. No. 12/898,661 / Filing Receipt, mailed Dec. 13, 2010, 3 pages.

U.S. Appl. No. 12/898,661 / Notice of Publication, mailed Apr. 5, 2012, 1 page.

U.S. Appl. No. 12/898,661 / Examiner's Search, mailed Sep. 10, 2012, 1 page.

U.S. Appl. No. 12/898,661 / Non-Final Rejection and Examiner Search, mailed Jan. 18, 2013 23 pages.

U.S. Appl. No. 12/898,661 / Amendment/Req for Reconsideration, filed Apr. 18, 2013, 15 pages.

U.S. Appl. No. 12/898,661 / Final Rejection, mailed Jun. 26, 2013, 23 pages.

U.S. Appl. No. 12/898,661 / RCE and Arguments, filed Sep. 26, 2013, 23 pages.

U.S. Appl. No. 12/898,661 / Non-Final Rejection and Examiner Search, mailed Jun. 18, 2014, 35 pages.

U.S. Appl. No. 12/898,661 / Non-Final Rejection, mailed Jul. 16, 2014, 29 pages.

U.S. Appl. No. 12/898,661 / Amendment/Req for Reconsideration, filed Oct. 16, 2014, 25 pages.

U.S. Appl. No. 12/898,661 / Final Rejection and Examiner Search, mailed Nov. 4, 2014, 37 pages.

U.S. Appl. No. 12/898,661 / Response After Final and Amendments, filed Feb. 4, 2015, 28 pages.

U.S. Appl. No. 12/898,661 / Advisory Action, mailed Feb. 25, 2015, 13 pages.

U.S. Appl. No. 12/898,661 / RCE and Amendments, filed Mar. 4, 2015, 28 pages.

U.S. Appl. No. 12/898,661 / Non-Final Rejection and Examiner Search, mailed Apr. 7, 2015, 39 pages.

U.S. Appl. No. 12/845,684; Issue Fee Payment, Aug. 11, 2015, 1 page.

(56) References Cited

OTHER PUBLICATIONS

U.S. Appl. No. 12/845,684; Issue Notification, Aug. 26, 2015, 1 page.
U.S. Appl. No. 12/898,644; Response After Final, Sep. 1, 2015, 19 pages.
U.S. Appl. No. 12/898,644; Advisory Action, Sep. 15, 2015, 12 pages.
U.S. Appl. No. 12/898,644; RCE and Amendments, Oct. 1, 2015, 21 pages.
U.S. Appl. No. 12/898,644; Non-Final Rejection, Mar. 22, 2016, 18 pages.
U.S. Appl. No. 12/898,661 / Final Rejection, Nov. 19, 2015, 32 pages.
U.S. Appl. No. 12/898,661 / Response After Final Action, and Amendments, Jan. 19, 2016, 32 pages.
U.S. Appl. No. 12/898,661 / Advisory Action, Feb. 24, 2016, 10 pages.
U.S. Appl. No. 12/898,661 / Notice of Appeal, Mar. 24, 2016, 2 pages.
Final Office Action, U.S. Appl. No. 12/898,644, filed Oct. 5, 2010, Mailed Oct. 31, 2016, 52 Pages.
Ivanov, "Geotag propogation in social networks based on user trust model," Multimed Tools Appl., DOI 10.1007/s11042-010-0570-7, Published online Jul. 18, 2010, 23 Pages.
Ahern, "World Explorer: Visualizing Aggregate Data from Unstructured Text in Geo-Referenced Collections," JCDL '07, Jun. 18-23, 2007, Vancouver, BC, Canada, Copyright 2007, ACM 978-1-59593-644-8/07/0006, http://www.georss.org/, 10 Pages.
Appeal Brief, U.S. Appl. No. 12/898,661, filed Oct. 5, 2010, Brief Filed Jun. 24, 2016, 74 Pages.
Response to Office Action, U.S. Appl. No. 12/898,644, filed Oct. 5, 2010, Reponse Filed Jul. 22, 2016, 28 Pages.

\* cited by examiner

| 300 | $l_1$ | LOCATIONS $l_2$ | ... | $l_n$ | COMBINED USER CREDIBILITY VALUES |
|---|---|---|---|---|---|
| $u_1$ | $h_{u_1}^{l_1} / t_{u_1}^{l_1}$ | $h_{u_1}^{l_2} / t_{u_1}^{l_2}$ | ... | $h_{u_1}^{l_n} / t_{u_1}^{l_n}$ | $c_{u_1}$ |
| $u_2$ | $h_{u_2}^{l_1} / t_{u_2}^{l_1}$ | $h_{u_2}^{l_2} / t_{u_2}^{l_2}$ | ... | $h_{u_2}^{l_n} / t_{u_2}^{l_n}$ | $c_{u_2}$ |
| ... | ... | ... | ... | ... | ... |
| $u_k$ | $h_{u_k}^{l_1} / t_{u_k}^{l_1}$ | $h_{u_k}^{l_2} / t_{u_k}^{l_2}$ | ... | $h_{u_k}^{l_n} / t_{u_k}^{l_n}$ | $c_{u_k}$ |

USERS

FIG. 3

Table 1: Contacts Per User

|  | min | max | avg | stddev | median |
|---|---|---|---|---|---|
| *indegree* | 1 | 27404 | 89.2 | 270 | 15 |
| *outdegree* | 1 | 19542 | 99.9 | 309 | 19 |

FIG. 6

Table 2: Contacts Per Geotagger

|  | min | max | avg | stddev | median |
|---|---|---|---|---|---|
| *indegree* | 1 | 14664 | 104 | 277.4 | 28 |
| *outdegree* | 1 | 14432 | 104 | 299.2 | 30 |

FIG. 7

Table 3: Geotagged Photos Per Geotagger

| min | max | avg | stddev |
|---|---|---|---|
| 1 | 92782 | 108 | 580 |

FIG. 8

```
1:  procedure EVALSOCIALINFLUENCE(U, G, A)
2:      U: Set of users
3:      G: Social Graph (from, to, friendship_create_time)
4:      A: Activation Times (user, activation_time)
5:      I: Set of Influenced Users 6:      I ← ∅
7:      for all u ∈ U do
8:          t₁ = getActivationTime(u, A)
9:          Nᵘ = getFriends(u, G)
10:         for all n ∈ Nᵘ do
11:             t₂ = getActivationTime(n, A)
12:             t₃ = getFriendshipCreateTime(u, n, G)
13:             if t₁ < t₂ && t₃ < t₂ then
14:                 I ← I ∪ n
15:             end if
16:         end for
17:     end for
18:     return |I|
19: end procedure
```

FIG. 17

MEDIA OR CONTENT TAGGING DETERMINED BY USER CREDIBILITY SIGNALS

CROSS-REFERENCE TO RELATED APPLICATIONS

The present application is related to concurrently filed U.S. patent application Ser. No. 12/898,644, titled "Measuring or Estimating User Credibility," by Murdock et al., and to concurrently filed U.S. patent application Ser. No. 12/898,661, titled "User Credibility in Electronic Media Advertising," by Murdock et al., both of which are incorporated herein by reference in their entirety, and assigned to the assignee of the presently claimed subject matter.

BACKGROUND

1. Field

The subject matter disclosed herein relates generally to media or content tagging.

2. Information

Electronic information in the form of electrical signals, for example, continues to be generated or otherwise identified, collected, stored, shared, or analyzed. Databases or other like repositories are commonplace, as are related communication networks or computing resources that provide access to stored signal information. As one example, the World Wide Web provided by the Internet continues to grow with seemingly continual addition of information.

Computing resources enable users to access a wide variety of signal information in the form of media or content, including text documents, images, video, or audio, to name just a few examples. Tools or services have been provided which allow for access to or organization of copious amounts of signal information. For example, some tools may enable users to associate supplemental signal information with media or content to indicate or describe a characteristic of the media or content. As one example, users may associate keywords (e.g., tags) or geographic locations (e.g., latitude and longitude coordinates) with media or content that are descriptive of a particular target geographic location. Supplemental information, for example, may be used to enable more searching or classifying of media or content by search engines or human users. However, with large amounts of signal information being made available, there is a continuing need for relevant information to be identified and presented in an effective manner.

BRIEF DESCRIPTION OF DRAWINGS

Claimed subject matter is particularly pointed out and distinctly claimed in the concluding portion of the specification. However, both as to organization or method of operation, together with objects, features, or advantages thereof, it may be better understood by reference to the following detailed description if read with the accompanying drawings in which:

FIG. 3 depicts a table of example user credibility signal sample values.

FIGS. 6-8 depict tables of user information obtained from an example of a communications network.

FIG. 17 depicts an example of a process for measuring or estimating potential social influence according to one implementation.

DETAILED DESCRIPTION

Figure 1:
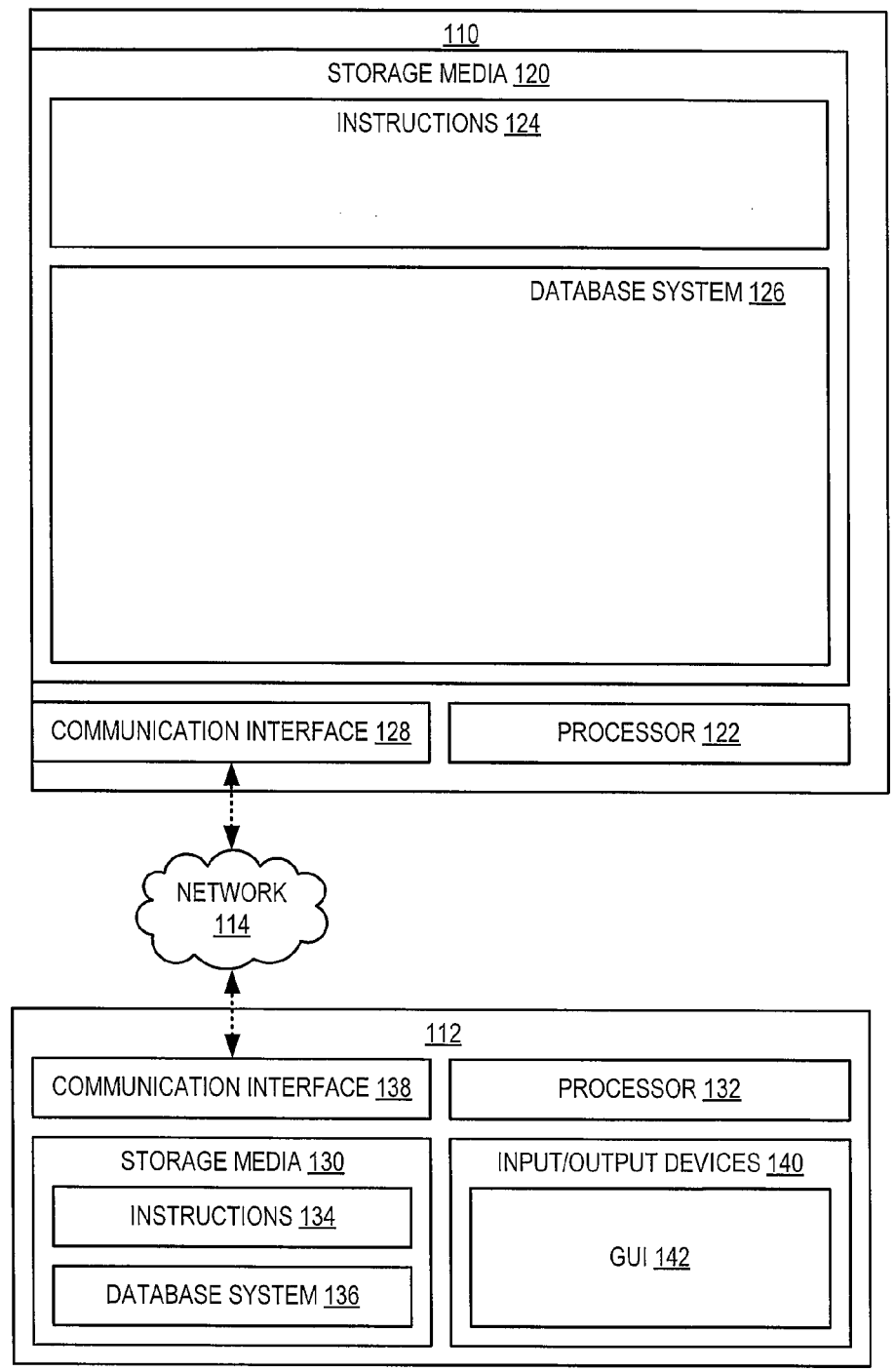
FIG. 1 is a schematic block diagram of an example computing environment according to one implementation.

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

Likewise, the terms, "and" and "or" as used herein may include a variety of meanings that also is expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe some combination of features, structures or characteristics. Though, it should be noted that this is merely an illustrative example and claimed subject matter is not limited to this example.

Some portions of the detailed description are presented in terms of algorithms or symbolic representations of operations on binary digital signals stored within a memory of a specific apparatus or special purpose computing device or platform. In the context of this particular disclosure, the term specific apparatus, special purpose computing device, or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It is further recognized that all or part of the various devices or networks described herein, or the processes, methods, or operations as further described herein, may be implemented using or otherwise include hardware, firmware, software, or any combination thereof, although to be clear, this is not intended to refer to software per se, which may constitute an abstract idea.

It has proven convenient at times, principally for reasons of common usage, to refer to signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the disclosed subject matter, it will be appreciated that throughout this specification discussions utilizing terms such as "processing," "computing," "calculating," "determining", "performing", "identifying", "obtaining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Implementations relating to methods, apparatuses, or systems are disclosed for measuring or estimating user credibility of one or more users in a variety of contexts, such as, for example, in connection with a communications network or other circumstances in which media or content may be communicated or otherwise transmitted or exchanged. In this context, a communications network may comprise an electronic social network. An electronic social network may refer to a communications network or web-based social grouping of individuals, such as, for example, an on-line virtual community who may share interests, ideas, activities, opinions, events, etc. by posting or otherwise communicating content via a communications network, such as the Internet (e.g., on on-line bulletin boards, discussion forums, blogs, profile homepages, etc.), wherein individual members of the group may be represented by nodes, and relationships between members may be represented by associational links or ties, for example. Likewise, estimates of user credibility may be applied or employed, for example, for more effective selection of useful or relevant signal information or content.

A communication or electronic social network may be centered around one or more characteristics of one or more electronic media or content items, such as with a photo sharing platform, such as Flickr, as an example. User's of a photo sharing platform may, for example, upload or share photos with other users, comment on or tag their own photos or the photos of other users, establish links between themselves and other users, or join user groups. Measuring or estimating user credibility in an electronic communication or social network may therefore provide a measure or estimate of accuracy or reliability attributed, at least in part, to a user in performing a particular activity or evaluating a particular characteristic with respect to electronic media or content items, such as, for example, geotagging of images.

User credibility may indicate a user's reputation with respect to the user's accuracy in engaging in a particular activity or evaluating a characteristic of electronic media or content items. However, it may be useful to determine whether or to what degree credibility of a user may potentially be correlated to social influence. In geotagging implementations, for example, social influence may be said to exist if a user's action to begin geotagging is influenced by one or more others having also utilized geotagging. Contrary to what one might expect, we conclude based on empirical evaluation that credibility of a user does not appear to be significantly correlated with social influence. This conclusion and supporting empirical analysis, including figures, is provided in more detail beginning at paragraph 55. Therefore, contrary to conventional wisdom, measuring or estimating user credibility may be accomplished largely independent of social influence. This useful and beneficial result leads to a convenient and tractable approach to estimating or measuring user credibility that might otherwise be overlooked.

As one example situation, without limitation, supplemental signal information, for example, intended to be descriptive of electronic content, such as a characteristic thereof, for example, may be suggested to a user for association with an electronic media or content item in at least one implementation by filtering a domain of supplemental information associated with electronic media or content items. Filtering of supplemental information, for example, may be based, at least in part, on user credibility signal sample values that estimate a user's accuracy in associating media or content items with supplemental information, including, for example, tags, user ratings, geographic locations, or other descriptive electronic information. User credibility signal sample values may be derived cumulatively over multiple associational acts performed by a user, for example. In this way, user credibility signal information may be used to assist in selection of content that may be presented to other users, for example. Content that is favored or otherwise identified by more credible users may be filtered or selected for presentation to a user in at least one implementation.

FIG. 1 is a schematic block diagram of an example computing environment 100 according to one implementation. As illustrated by FIG. 1, example computing environment 100 may include special purpose computing devices or systems, such as 110 or 112, for example. Special purpose computing devices or systems, such as 110 or 112, may, for example, comprise a desktop computer, a laptop computer, a handheld computer, a mobile computing device, or other suitable media device(s) that include computing capabilities along with the device(s), such as, for example, a camera device, a telecommunications device, a media player device, a personal digital assistant, etc.

For example and without limitation, device or system 110 may comprise a server system. Likewise, one or more devices or systems, such as 112 may, for example, but without limitation, comprise a network client. Likewise, in at least one embodiment, devices or systems, such as 110 or 112, may communicate via a network 114. For example, and without limitation, network 114 may comprise one or more local area networks, one or more wide area networks, one or more cell phone networks, one or more wire line telephone networks, one or more personal area networks, the Internet or any combination thereof, just to name a few possible examples. Likewise, it is, of course, understood, that an implementation or embodiment is not limited in scope to a particular number of special purpose computing devices. Example computing environment 100 may include one, two, three, tens, hundreds, thousands, millions, or more special purpose computing devices, for example Accordingly, devices or systems 110 or 112 may also include storage media, such as, for example, 120 or 130, and one or more processors, such as, for example, 122 or 132. Likewise, storage media, such as 120 or 130, for example, may include instructions stored thereon, such as 124 or 134, for example, that may be executable, for example, by one or more processors to perform one or more operations, processes, or methods, including those, for example, described in more detail hereinafter. As one example, instructions 124 or 134 may comprise a web browser application or other suitable program, software, or firmware, etc. to retrieve, load, or process signal information (e.g., electronic documents or the like), such as may be communicated between special purpose computing devices, for example. Devices or systems 110 or 112 may further include a communication interface, such as 128 or 138, for example, to facilitate wired or wireless communication via network 114, for example, by transmitting or receiving signal information.

Systems or devices 110 or 112 may include one or more peripherals, such as, for example, one or more input devices or output devices. Non-limiting examples of input devices include a keyboard, a touch-screen, a touch-pad, a microphone, a camera, or a pointing device, such as a controller or a mouse, etc. Non-limiting examples of output devices include an audio speaker, a tactile feedback device, a display, a touch-screen, etc. In at least one implementation, devices or systems may also include a graphical user interface (GUI) application or other suitable program, software, or firmware, etc., such as 142. As one example, execution of a GUI 142 may result in display of icons or other small pictographs, such as in the form of bit maps, for example, which may be capable of being viewed via an output device, although this is merely one illustrative example.

Again, implementation or example 100 is provided for purposes of illustration and claimed subject matter is not limited in scope to implementation or example 100. For example, server system 110 may comprise one or more computing platforms such as, for example, one or more network servers. As alluded to previously, server system 110 may include storage media 120 and one or more processors, such as example processor 122. Also alluded to previously, storage media 120 may include instructions 124 stored thereon that may be executable, for example, by one or more processors, such as, for example, processor 122, to perform one or more operations, processes, or methods, including, for example, operations, processes, or methods described in more detail hereinafter. Storage media 120 may further include an electronic repository to store signal information, such as database system 126, for example. Likewise, one or more processors of system 110, such as, for example, processor 122, may be capable of writing signal information to or reading signal information from storage media 120, for example. Likewise, as also alluded to above, server system 110 may further include a communication interface 128 to facilitate wired or wireless communication via network 114, such as transmitting or receiving electronic signal information, for example.

Server system 110 may suggest supplemental information to be associated with one or more electronic media or content items responsive to user signal information received, for example, from network client 112. However, computing environment 100 depicts a non-limiting example of a computing platform for suggesting supplemental information to be associated with media or content. Other suitable computing platforms and network configuration may be utilized where appropriate in other implementations or embodiments.

In at least one implementation, server system 110 may be operated as a stand-alone special purpose computing platform. Server system 110 may further include any suitable user interface for facilitating user interaction with server system 110. Hence, potential implementations or embodiments within the scope of claimed subject matter are not limited to a particular configuration or a particular computing environment.

Referring again to server system 110, database system 126 may include a media or content library comprising a plurality of media or content items, including one or more example media or content items. A media or content item may comprise stored signal information representative of a variety of types of content, including, for example, visual content (e.g., an image, a video, textual content, etc.) or audio content (e.g., a sound recording). Accordingly, a media or content item may comprise binary digital signals, for example, arranged according to any suitable format including, for example, .jpeg, .mpeg, .mp3, .txt, etc., among other formats. A media or content library may comprise any number of media or content items, including tens, thousands, millions, or more media or content items, for example.

Media or content items may be associated by a database system, such as, for example, database system 126, with a variety of supplemental information. For example, a media or content item may be associated with supplemental information. Although claimed subject matter is not limited in scope in this respect, as one example, supplemental information may include: user associated information, target information that may indicate target values (e.g., target geographic locations) for media or content items, or user identifiers that may identify particular users, as explained in more detail below.

In at least one implementation, supplemental signal information may be associated with a media or content item as binary digital signals that may comprise part or a portion of a media or content item itself. In another implementation, supplemental signal information, such as binary digital signals, may be associated with a media or content item using any suitable database system including, for example, relational models, hierarchical models, or network models to name a few examples.

In at least one implementation, supplemental signal information, such as binary digital signals, may be associated with media or content items. Supplemental signal information may, for example, be organized by database system 126. As a non-limiting example, a user may associate supplemental signal information or characteristics, including one or more descriptive tags, one or more geographic locations, user ratings, or other suitable supplemental signal information, with a media or content item. In at least one implementation, for example, a user identifier may indicate a particular user that associated supplemental signal information with the media or content item, as explained in more detail below.

Database system 126 may further include a user database, which may, for example, maintain signal information relating to user interactions with a server system, such as 110, for example. User interactions may include, for example, uploading a media or content item to server system 110 or associating supplemental signal information with a media or content item. For example, user signal information may be representative of signal information relating to individual users, such as comprising user account information or a user identifier, as described above. A user database may include user signal information for any number of users, including tens, thousands, millions, or more users, for example.

In at least one implementation, user signal information may also comprise an associated user credibility indicator attributed, at least in part, to an individual user. In at least one implementation, a user identifier may also enable distinguishing a variety of interactions by multiple users, such as with server system 110, for example. A user identified by a user identifier may have, in an interaction, associated supplemental signal information with a media or content item. In this particular example, a user identifier may indicate that a user has uploaded a media or content item or associated supplemental information with a media or content item. As non-limiting examples, a user identifier may comprise an email address, a user reference number or character string, etc. A user credibility indicator may indicate one or more user credibility signal sample values, as described in more detail below. In at least one implementation, a user identifier may be presented along with an associated user credibility indicator to other users, such as via a communication network. In this way, users may identify a particular user by a user identifier and a credibility signal sample value for the particular user indicated by the user credibility indicator.

A user credibility indicator may include one or more user credibility signal sample values. As one example, user credibility indicator may include a plurality of user credibility signal sample values that collectively comprise a user credibility vector attributed, at least in part, to a user. As will be described in greater detail with reference to FIGS. 2 and 3, a user credibility vector comprising a plurality of user credibility signal sample values may provide an estimate or a measurement of a user's accuracy in associating supplemental signal information with media or content items across a plurality of categories. In at least one implementation, location tags may be divided into a plurality of different categories representative of a hierarchy of categories. For example, location tags may be divided into a point of interest category, a town category, or a country category with a category having a corresponding user credibility signal sample value attributed, at least in part, to a user. As a non-limiting example, a user may associate an image of the Eiffel Tower with location tags that include "Eiffel Tower" indicating a point of interest, "Paris" indicating a town, and "France" indicating a country. However, in another implementation, a user credibility indicator may provide one or more user credibility signal sample values attributed, at least in part, to a user to indicate or identify a measure or estimate of a user's accuracy in associating supplemental signal information with media or content items.

Figure 2:
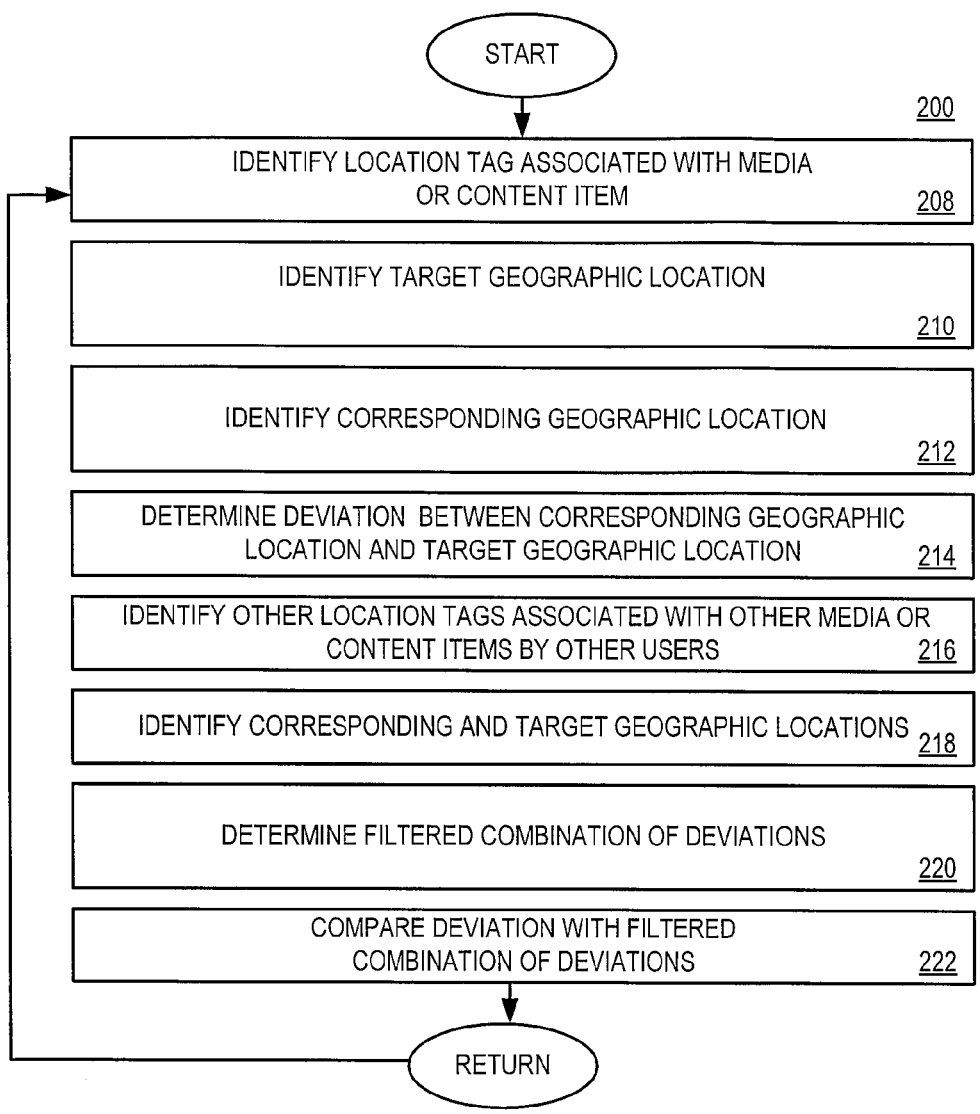
FIG. 2 is a flow diagram illustrating an example process for media or content tagging.

FIG. 2 is a flow diagram illustrating an example process 200 of media or content tagging according to one implementation. Of course, claimed subject matter is not limited in scope to the example of embodiment shown in FIG. 2. For example, other process embodiments may include additional operations, alternate operations, omit operations or employ operations shown in FIG. 2 in another order. User credibility may be measured or estimated at least in part by one or more user credibility signal sample values attributed, at least in part, to a particular user, for example. User credibility signal sample values estimated in accordance with process 200, for example, may be used to associate supplemental signal information media or content, as will be described in greater detail with reference to process 400 of FIG. 4 and process 500 of FIG. 5.

Beginning at 208, a location tag associated with a media or content item may be identified, such as by a user. As previously described with reference to FIG. 1, a media or content item (p) of a set (P) comprising one or more media or content items (e.g., expressed as p∈P) may be associated with a set of tags: $T_p = \{t_{p1}, t_{p2}, \ldots, t_{pk}\}$. Tags may comprise, for example, one or more text strings, such as words or phrases assigned to a media or content item, such as by a user, to indicate or describe a characteristic, such as a context or content of a media or content item, for example. Tags associated with media or content items may be used, for example, so that media or content items may be conveniently browsed, categorized, or searched, for example. Of course, claimed subject matter is not limited in scope to employing text strings. Any of a host of a variety of forms of content for a tag may be employed and is intended to be included within the scope of claimed subject matter. For example, without limitation, a tag may comprise audio content in the form of binary digital signals.

At least some tags for one or more media or content items may be employed to indicate geographic location and may be referred to herein as location tags. For example, let $T_{p_g} \subseteq T_p$ comprise a subset of location tags that indicate geographic location. For a media or content item of a set of media or content items, location tags $T_{p_g}$ may be identified from a set of tags $T_p$ associated with that media or content item. However, location tags may at times be challenging to unambiguously identify from a set of tags for a particular media or content item. For example, if users are permitted to utilize freeform text, as one example, user generated freeform text may be susceptible to misspellings, typographical errors, alternative spellings, or alternative naming conventions (e.g., nicknames), as an illustrative example.

A variety of approaches may be employed so that one or more location tags may be appropriately identified. Accordingly, in at least one implementation, a text string or other electronic signal employed as an identifier or tag may be processed to determine whether or not the tag or other electronic identifier comprises a location tag. In at least one implementation, for example, a probability that text is or is not representative of a location tag may be computed. To identify location mentions in tags, Yahoo! Placemaker, a geoparsing Web service, may, for example, be employed. Provided with text, the service returns the probability that the text is a place name (e.g., the probability of the word "altitude" or "urban area" to be a place name is 0.077 and 0.055 respectively, while the probability of the word "lake echo" or "quebec city" to be a place name is 0.71 and 0.89 respectively). The Yahoo! Placemaker™ service takes care of the data cleansing process and considers variants of place names in the identification process. Furthermore, the probability model (text is recognized as place with a certain probability) provides flexibility in which tags to accept as place names, by filtering out those that are below a threshold. Although in one embodiment, a probabilistic model is used to determine the place, any method to associate the tags with the place mentioned in the tags would suffice. For example, the location mentioned in the tags could be determined by looking the tags up in a dictionary of places, to determine whether they match or not.

The use of a probability model to indicate whether or not a tag comprises a location tag may be applied, for example, to distinguish location tags from non-location indicating tags in at least one implementation. For example, tags that do not indicate a geographic location with sufficient probability may be identified or distinguished from tags exhibiting a higher probability by applying a probability threshold or other suitable filtering process. For example, a probability of 0.7 may employed in at least one implementation. From an initial set of 6,756,605 unique free-text tags, for example, 241,072 unique location tags were obtained. Note that this is the number of distinct location tags, so even if a location tag is very popular (such as "paris") it appears once. Accordingly, for a media or content item of a set of media or content items, a set of location tags associated with that media or content item may be identified by examining a set of tags associated with a media or content item and omitting those tags that are determined or estimated to be less likely to refer to geographical locations.

Furthermore, in at least one implementation, variants of location names to identify location tags may be appropriately considered. For example, a database comprising a set of geographic location name variants representative of alternative spellings, alternative names, misspellings, or typographical errors may be employed. As suggested above, in at least one implementation, the Yahoo! Placemaker™ brand web service in at least one implementation may be employed. However, claimed subject matter is not limited in scope to this particular service, which is provided as an illustrative example.

At 210, for a location tag associated with a media or content item, as identified at operation 208, a target geographic location ($w_i$) may also be identified. In at least one implementation, a target geographic location identified for a given location tag may comprise a geographic identifier for a particular target geographic location so that it may be distinguished from other potential target geographic locations. As a non-limiting example, where a location tag comprises a text string (e.g., "Tokyo"), as one example, a geographic identifier may indicate longitude and latitude signal sample values as a target geographic location. For example, without limitation, process example 500, described below, may be applied to determine a target geographic location for a location tag.

At 212, for a location tag associated with a media or content item identified at operation 208, a geographic location may be identified that is also associated with that media or content item. For example, a user may indicate a corresponding geographic location associated with a media or content item, where a location tag also is associated with the media or content item. Supplemental signal information in the form of a location tag or corresponding geographic location identifier may have been previously been associated by a user with a media or content item and stored by a server system, such as 110, for example. As one illustrative example, a user may have previously employed a graphical user interface to position a media or content item on a map displayed to the user to indicate a geographic location to be associated with the media or content item. Alternately, a user may have entered longitude or latitude signal sample values to indicate a geographic location to be associated with a media or content item. These are, of course, non-limiting illustrative examples At 214, a deviation ($d_i, w_i$) may be determined between a corresponding geographic location identified at 212 and a target geographic location ($w_i$) identified at 210. In at least one implementation, the deviation may comprise a distance between an associated or corresponding geographic location for a media or content item and a target geographic location. As a non-limiting example, distance may be determined as a geodesic distance that at least partially accounts for curvature of earth's surface. However, distances may be determined at operation 214, including distances that may at least partially account for differences in elevation between a target geographic location indicated by a location tag and a corresponding geographic location associated with a media or content item by a user, for example.

At 216, other location tags associated by other users may be identified, such as for target geographic location ($w_i$) identified at 210, for example. In at least one implementation, a database system, such as 126, may identify one or more other media or content items associated with the one or more location tags. In at least one implementation, a database system may reference geographic locations associated with media or content items by other users. For example, in at least one implementation, a distance of geographic locations from a target location may be compared to a threshold distance to identify media or content items located within a threshold distance of a target location. For media or content items located within a threshold distance of a target location, one or more location tags associated with those media or content items may be identified. In addition or alternately, in an implementation, location tags that are identical or substantially identical to a location tag associated with a media or content item identified at operation 208 may be identified among other media or content items. A database system may identify media or content items associated with location tags, for example At 218, corresponding geographic locations that may have been identified or associated by users with other media or content items and target geographic locations may now be identified at operation 216. For example, one or more geographic locations that have been associated by other users with one or more media or content items as indicated by one or more other location tags may be identified at operation 216 using a database system. In addition or alternately, associated supplemental signal information to identify an associational activity of other users may be employed, as previously described, for example, may be employed. Likewise, target geographic locations similar to as described above in connection with operation 210 may be identified.

At 220, a filtered combination of deviations at least partially attributed to other users may be determined between corresponding geographic locations identified and one or more target locations, similar to an approach previously described in connection with operations 208 to 214. For example, at 220, a plurality of deviations attributed, at least in part, to one or more other users may be processed to determine a filtered combination of the plurality of deviations. As one example, a filtered combination may comprise an average of deviations attributed, at least in part, to other users. A filtered combination of deviations of multiple users' associational activity may be obtained. This may include, for example, users that have previously had acceptable user credibility scores.

At 222, a deviation attributed, at least in part, to a user determined at 214 may be compared to a filtered combination of deviations attributed, at least in part, to other users determined at 220. In at least one implementation, a comparison performed at operation 222 may be used to identify whether a deviation attributed, at least in part, to a user is within a particular range of a filtered combination of deviations attributed, at least in part, to other users.

In at least one implementation, a comparison may be used to produce a binary result, although, of course, claimed subject matter is not limited in scope in this respect. As a non-limiting example, a user's associational activity, e.g., associating supplemental signal information such as a tag or a geographic location with a media or content item, may be considered a "hit" if a difference between a filtered combination of deviations $\overline{d_u^{w_i}}$ attributed, at least in part, to other users and a deviation attributed, at least in part, to a particular user is larger than λ times a standard deviation $\sigma^{w_i}$. For example, let $W=\{w_1, w_2, \ldots, w_k\}$ be a set of distinct target geographic locations in a set after mapping media or content items to a corresponding target geographic location. Let a random variable D represent distances in a users' associational activity from target geographic locations. Assume that for a specific geographic location $w_i$ a random variable D takes on N real sample values $d_1^{w_i}, d_2^{w_i}, \ldots, d_N^{w_i}$, with arithmetic mean $\overline{d^{w_i}}$ and standard deviation $\sigma^{w_i}$ of users' sample distances for a target geographic location. Accordingly, a "hit" may be indicated if relationship (1) is satisfied and a "miss" may be indicated if relationship (2) is satisfied.

$$\overline{d^{w_i}} - d_u^{w_i} > \lambda \cdot \sigma^{w_i} \quad (1)$$

$$\overline{d^{w_i}} - d_u^{w_i} \leq \lambda \cdot \sigma^{w_i} \quad (2)$$

In the above relationships (1) and (2), λ comprises a parameter to affect selectivity of hits or misses in an associational process. A smaller λ may indicate that a hit is more likely than if λ where larger. That is, a larger deviation from a target geographic location would then be tolerated. Relationships (1) and (2) are non-limiting examples for distinguishing hits and misses. Applying this particular approach, for example, a particular user may be assessed as credible or not credible in comparison with other users, although, of course, again, claimed subject matter is not limited in scope in this respect.

Figure 18:
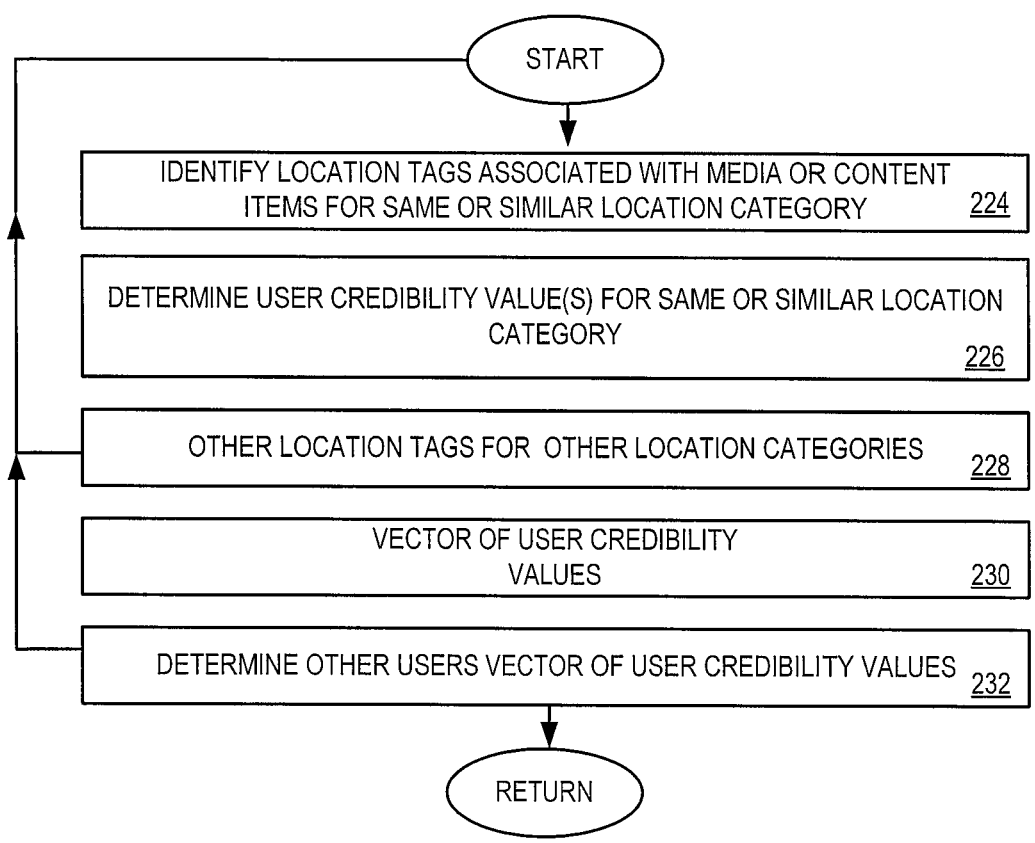
FIG. 18 is a flow diagram illustrating yet another example process for media or content tagging.

FIG. 18 is a flow chart illustrating another example of a process embodiment 219 in accordance with claimed subject matter. This particular embodiment may be applied, for example, for media or content tagging. Of course, claimed subject matter is not limited in scope to the example of embodiment shown in FIG. 18. For example, other process embodiments may include additional operations, alternate operations, omit operations or employ operations shown in FIG. 18 in another order.

At 224, location tags associated with media or content items may be identified over multiple associational interactions, but for location tags assessed to be for a same of similar location category. Thus, for example, operations similar to those discussed above in connection with FIG. 2, such as 208-222, for example, may be performed, as described in more detail below. However, comparisons between deviations attributed, at least in part, to a user and a filtered combination of deviations attributed, at least in part, to other users may be divided into two or more categories in at least one implementation. As previously described, location tags may be divided into two or more location categories including, for example, a point of interest category, a town category, or a country category.

Using multiple categories for identifying user credibility, therefore, one or more of operations may be performed for location tags associated with media or content items for a same or similar location category, although claimed subject matter is not limited in scope in this respect. At 226, for example, one or more user credibility signal sample values may be determined based at least in part on comparisons, similar to the comparison described previously for operation 222 of FIG. 2, but for one or more location tags of a same or a similar location category. Referring also to FIG. 3, a table 300 of user credibility signal sample values is depicted for an example set. As shown in table 300, let $U=\{u_1, u_2, \ldots, u_k\}$ be a set of k users, and let $L=\{l_1, l_2, \ldots, l_n\}$ be a set of n location categories. Credibility of a user u∈U for a specific location category $l_i$ may be defined as the number of hits $h_u^{l_i}$ of a given location category, divided by a total number of associated media or content items of that location category $t_u^{l_i}$. Referring again to FIG. 18, at 228, one or more of operations may be performed for location tags of other location categories for which a user associated location tags with one or more media or content items.

Where user credibility signal sample values are determined for two or more location categories for a particular user, for example, the two or more user credibility signal sample values may comprise a user credibility vector attributed, at least in part, to the user, illustrated by operation 230, for example. A user may be attributed, at least in part, with a combined user credibility sample value ($c_u$) in at least one implementation that comprises a combination of two or more user credibility signal sample values of two or more location categories. For example, referring to table 300 of FIG. 3, if subscripts 1, 2, . . . k of $c_u$, denote location categories, a combined user credibility signal sample value may comprise a filtered combination of two or more user credibility sample values, such as an average or other combination.

At 230, however, alternately or in addition, as suggested above, a vector of user credibility sample values may be attributed, at least in part, to a user. At 232, one or more of operations may be performed for other users to obtain a vector of user credibility sample values attributed, at least in part, to other users. Accordingly, example process 219, for an embodiment, may be performed, at least in part, by a special purpose computing platform, such as, for example, described in connection with FIG. 1, to evaluate user credibility signal sample values for users that have associated media or content items with supplemental signal information (e.g., location tags or geographic locations).

Figure 19:
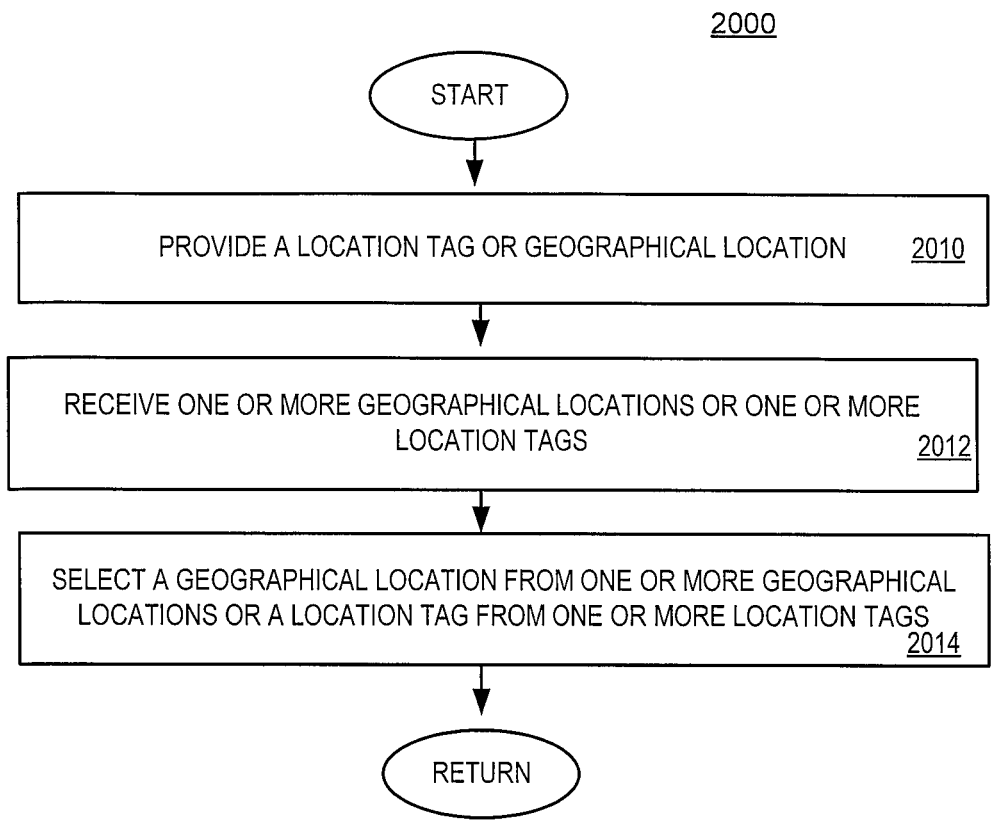
FIG. 19 is a flow diagram illustrating still another example process for media or content tagging.

FIG. 19 is a flow diagram illustrating still one more example process 2000 for media or content tagging. In at least one implementation, process 2000 may be performed, at least in part, by a special purpose processor executing instructions, for example. Of course, claimed subject matter is not limited in scope to the example of embodiment shown in FIG. 19. For example, other process embodiments may include additional operations, alternate operations, omit operations or employ operations shown in FIG. 19 in another order.

At 2010, a user may provide a location tag or a geographical location, for example, to be associated with a media or content item. For example, a browser may be executing on a special purpose computing platform. A user may download a media or content item from a server, for example, via a browser request. Likewise, through the browser, a user may transmit a location tag or a geographical location to be associated, for example. At 2012, a user may receive one or more location tags or geographical locations via the browser, for example. If a location tag was transmitted, one or more geographical locations, may, for example, be received. Likewise, if a geographical location was transmitted, one or more location tags may be received. At 2014, a user may make a selection and transmit the selection. For example, if geographical locations were received, a user may transmit a selected geographical location. Likewise, if location tags were received, a user may transmit a selected location tag. Of course, FIG. 19 is intended to merely provide an illustrative example. It is not intended that claimed subject matter be limited to FIG. 19.

Figure 4:
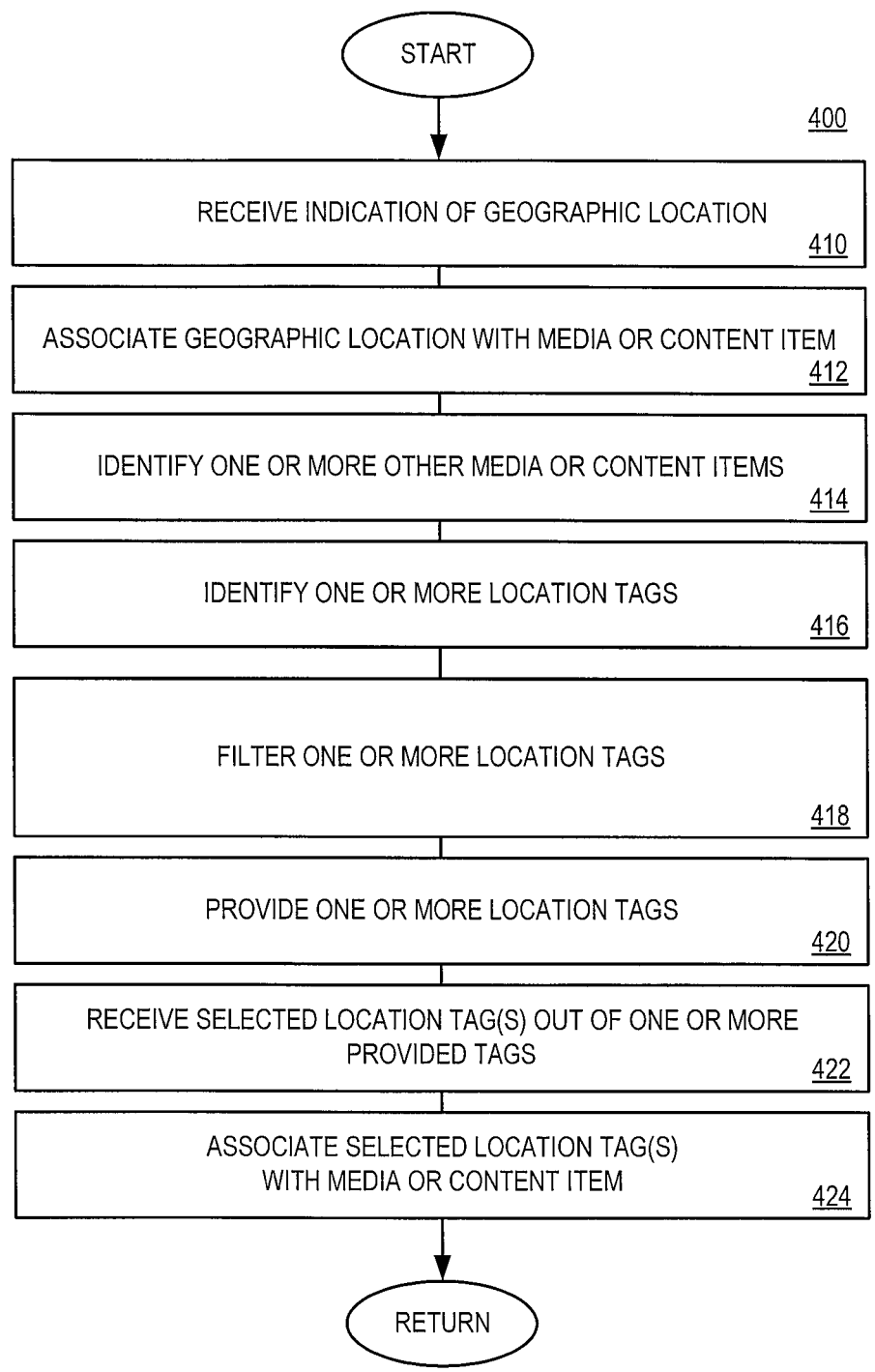
FIG. 4 is a flow diagram illustrating another example process for media or content tagging.

FIG. 4 is a flow diagram illustrating another example process 400 for associating tags with media or content items according to one implementation. Of course, claimed subject matter is not limited in scope to the example of embodiment shown in FIG. 4. For example, other process embodiments may include additional operations, alternate operations, omit operations or employ operations shown in FIG. 4 in another order.

Tags are described previously; however, tags may comprise location tags or non-location tags for purposes of this illustrative implementation, as described below in more detail. In at least one implementation, process 400 may be performed, at least in part, by a special purpose processor executing instructions, for example.

At 410, signal information may be obtained. For example, but without limitation, this may include receiving signal information indicating a geographic location to be associated with a media or content item. In at least one implementation, signal information may be received via a special purpose computing platform, such as previously described, e.g., network client 112, where it may be transmitted to a server system, such as 110, via a network, such as 114. Signal information may be received from a user via a GUI 142, again, previously described in connection with FIG. 1, as an illustrative example.

Signal information may be received in connection with a graphical representation of a geographic region. As a non-limiting example, a user may indicate or select a geographic location to be associated with a media or content item by pointing to or selecting a geographic location via touch (e.g., at a touch-screen) or pointing device such as, for example, a mouse or touch-pad, etc. For example, a user may drag a graphical representation of a media or content item onto a graphical representation of a geographic region to indicate a geographic location to be associated with a media or content item. Alternatively or additionally, in at least one implementation, signal information may be received, such as via a user input device, as a latitude signal sample value or a longitude signal sample value submitted indicating a geographic location with which a media or content item is to be associated. Of course, still other suitable approaches not specifically described may be used for receiving signal information indicating a geographic location to be associated with a media or content item. Claimed subject matter is not limited in scope to a particular approach or technique.

At 412, a geographic location indicated by a user may be associated with a media or content item. In at least one implementation, for example, a geographic location identifier may be associated with a media or content item, for example, by a database system. FIG. 1 illustrates database 126 of server system 110 as an example.

At 414, one or more other media or content items for a geographic location indicated by signal information may be identified. In at least one implementation, media or content items indicated to be located within a threshold distance of a geographic location indicated at operation 410 may be identified at operation 414, for example.

At 416, one or more tags associated with media or content items that were identified in operation 414 may also now be identified. For example, for an implementation where tags associated with media or content items include location tags and non-location identifying tags, a web service, as previously described may be employed to distinguish location tags from non-location identifying tags. Yahoo! Placemaker, a geoparsing Web service, may, for example, be employed. Likewise, a probability based model for distinguishing location tags from non-location identifying tags, such as previously described at operation 208 of FIG. 2, for example, may be employed.

At 418, one or more identified location tags may be filtered to identify one or more tags to be associated with the media or content item. In at least one implementation, one or more location tags may be filtered based at least in part on user credibility signal sample values. Any suitable approach to filtering location tags based at least in part on user credibility signal sample values may be utilized.

As one example, of the location tags identified, a subset of those location tags may be provided that have been associated by a user with at least a threshold user credibility signal sample value. As another example, a subset of location tags may be provided based at least in part on the location tags associated by those users with greater user credibility out of the group of location tags identified. Any of a host of approaches may be employed, such as the upper X % of the group, as one simple example In at least one implementation, filtering performed at operation 418 may be further based at least in part on geographic proximity. For example, tags may be limited within a threshold geographic proximity of the geographic location of operation 410. At 420, one or more location tags identified at 418 may be stored (e.g., on an electronic storage medium) or transmission may be initiated. At 422, other signal information may be received indicating one or more selected tags from the tags provided, such as by a user. At 424, a selected tag or multiple selected tags may be associated with a media or content item. By application of process 400, one or more tags may be associated with a media or content item in response to signal information indicating a geographic location to be associated with a media or content item.

Figure 5:
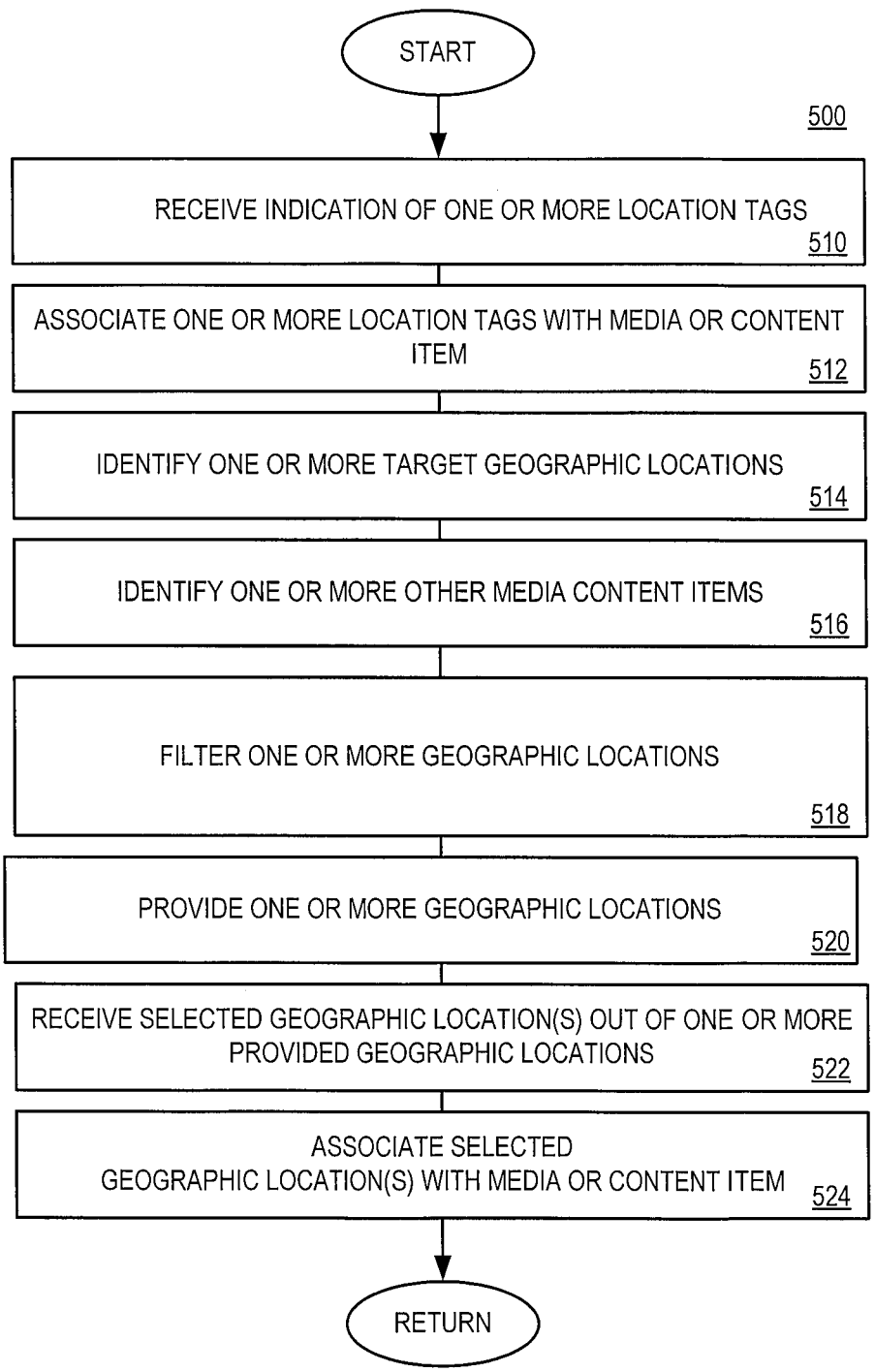
FIG. 5 is a flow diagram illustrating still another example process for media or content tagging.

FIG. 5 is a flow diagram illustrating an example process for associating geographic locations with one or more media or content items according to one implementation. In at least one implementation, process 500 may be performed, at least in part, by a special purpose processor executing instructions, for example. Of course, claimed subject matter is not limited in scope to the example of embodiment shown in FIG. 5. For example, other process embodiments may include additional operations, alternate operations, omit operations or employ operations shown in FIG. 5 in another order.

At 510, At 410, signal information may be obtained. For example, but without limitation, this may include receiving signal information indicating one or more location tags to be associated with a media or content item. In at least one implementation, signal information may be received via a special purpose computing platform, such as previously described, e.g., network client 112, where it may be transmitted to a server system, such as 110, via a network, such as 114. Signal information may be received from a user via a GUI 142, again, previously described in connection with FIG. 1, as an illustrative example. Again, signal information may be received indicating one or more location tags to be associated with a media or content item. For example, a location tag may be received as a text string representing one or more terms, although signal information may likewise be received in other forms. For example, without limitation, signal information may be received as audio content, as previously indicated.

At 512, the one or more location tags received or identified may be associated with a media or content item. At 514, one or more geographic locations may be indicated by the one or more location tags. However, a location tag comprising a particular geographic name, in some situations, may not be sufficient to unambiguously identify a target geographic location. For example, a geographic name may indicate more than one target geographic location. This scenario may occur with descriptive names such as Newcastle, Takayama (Japanese for high mountain) or Matsushima (Japanese for pine island), names of saints, or emigrated communities (e.g., Athens), as examples. However, users may deliberately use unambiguous place names within local areas. Under this assumption, for example, it may be possible to reduce or eliminate duplicate geographic names referring to two or more different target geographic locations by applying one or more heuristics.

As one example heuristic, a search for a geographic location based, at least in part, on a location tag may be focused with respect to one or more reference points. In at least one implementation, a reference point may comprise a geographic location indicated by signal information, whereby a search may be initiated at or near the reference point before extending the search outward from the reference point. Hence, latitude and longitude coordinates, for example, may be used to define a reference point to disambiguate a particular geographic location from other possible geographic locations with a similar geographic name. As another example heuristic, knowledge of a hierarchy of geographic locations may be used to reduce a search area. For example, a first location tag that indicates country category "France" may be used to limit a search for a town category "Paris" to within a geographic region of France.

Accordingly, a set of location tags and one or more reference points as parameters may be employed to produce an ordered list of possible or potential geographic locations, for example. The list of geographic locations may be ordered from most likely to least likely based, at least in part, on a probability model, for example. Applying heuristics, such as those previously described, it may be possible to identify a geographic location with a probability that is larger than 0.9, for example. In at least one implementation, a geographic location identified for a given location tag may comprise a geographic identifier so that a particular geographic location to be distinguished from other possible or potential geographic locations. As one example, a geographic identifier may indicate longitude and latitude signal sample values representative of a geographic location.

At 516, one or more other media or content items may be identified as associated with the particular geographic location determined as more probably or likely than the others. As a non-limiting example, media or content items that are indicated to be associated with geographic locations reasonably proximity to particular geographic location or within a threshold distance may be identified.

At 518, one or more identified location tags may be filtered to identify one or more geographic locations to be associated with the media or content item. In at least one implementation, one or more geographic locations may be filtered based at least in part on user credibility signal sample values. Any suitable approach to filtering geographic locations based at least in part on user credibility signal sample values may be utilized.

As one example, of the geographic locations identified, a subset of those may be provided that have been associated by a user with at least a threshold user credibility signal sample value. As another example, a subset may be provided based at least in part on those associated by users with greater user credibility out of the group identified. Any of a host of approaches may be employed, such as the upper X % of the group, as one simple example In at least one implementation, filtering performed at operation 518 may be further based at least in part on geographic proximity. For example, location may be limited within a threshold geographic proximity of the particular geographic location. At 520, one or more geographic locations identified at 418 may be stored (e.g., on an electronic storage medium) or transmission may be initiated. At 522, other signal information may be received indicating one or more selected geographic from those provided, such as selected by a user. At 524, a selected geographic location or multiple selected geographic locations may be associated with a media or content item. By application of process 500, one or more geographic locations may be associated with a media or content item in response to signal information indicating a location tag to be associated with a media or content item, for example.

Referring to FIG. 3, mentioned previously, a table 300 of user credibility sample values is depicted for an example set, as previously described. As shown in table 300, let $U=\{u_1, u_2, \ldots, u_k\}$ be a set of k users, and let $L=\{l_1, l_2, \ldots, l_n\}$ be a set of n location categories. Credibility of a user $u \in U$ for a specific location category $l_i$ may be defined as the number of hits $h_u^{l_i}$ of a given location category, divided by a total number of associated media or content items of that location category $t_u^{l_i}$. Where a user credibility signal sample value is determined for a user for two or more location categories, the two or more user credibility signal sample values may comprise a user credibility vector attributed, at least in part, to the user. Alternately or in addition, a user may be attributed, at least in part, with a combined user credibility sample value ($c_u$) in at least one implementation that comprises a combination of two or more user credibility signal sample values of two or more location categories. For example, referring to table 300 of FIG. 3, if subscripts 1, 2, . . . k of $c_u$, denote location categories, a combined user credibility signal sample value may comprise a filtered combination of two or more user credibility sample values, such as an average or other combination.

As discussed previously, claimed subject matter, such as, for example, embodiments described above, measure or estimate user credibility by treating user credibility as largely independent of social influence. Although a convenient assumption, supplying empirical evidence to support this conclusion demonstrates the utility of subject matter, such as the embodiments previously described, for example.

In at least some communication or electronic social networks, such as Flickr, for example, a user may be notified if other linked or connected users perform certain actions such as, for example, geotagging a media or content item. In the above example, social influence may be defined to exist if a first user has a social connection in a social network with at least one other user that has previously performed certain actions before the first user. For example, we refer to performing certain actions as activation and refer to users as nodes of a network. In one example, a method to determine if activation of a node may be attributed to social influence may comprise evaluating whether activation of one or more nodes over a monitoring period [0,T] occurs randomly or is instead influenced by earlier activation of neighboring nodes in the social network. If the latter condition exists, then it may be assumed that some social influence exists in the social system, and therefore nodes that have one or more already active neighboring nodes may be considered to have a higher probability of being activated than nodes not already having one or more active neighboring nodes. Here, a time of activation of nodes may identify potential social influence.

For example, let $A=\{v_1, v_2, \ldots, v_k\}$ comprise a set of k users that are activated during a period [0,T] and assume that user Vi is activated at time $t_i$. Since activations are considered to occur in discrete time, an ordering of k activation times may be identified. To determine whether social influence exists in a social network, a shuffle test may be performed, which may comprise, for example, the following two operations.

Operation 1 (Original): Performing certain actions (e.g., geotagging) by one or more users may be observed in a social network in a period [0,T]. For node activation it may be determined whether the activation may be attributed to social influence, for example, according to the above described definition of social influence (e.g., at least one neighboring node is already active before activation of the node). Let $A_{SI} \subseteq A$ denote a set of node activations that may be attributed to social influence. The effect of social influence $SI_{original}$ may be identified from the relationship:

$$SI_{original} = \frac{A_{SI}}{A}$$

Operation 2 (Shuffled): Next a second instance may be created with the same or substantially the same graph G and the same or substantially the same set A of active nodes as described above, for example, by selecting a random or other suitable permutation $\pi$ of $\{1, 2, \ldots, k\}$ and setting the time of activation of node $v_i$ to $t_i':=t_{\pi(i)}$. Again, activation may be observed in the period [0,T] as in Operation 1 above, and a new set $A_{SI}' \subseteq A$ of activations may be determined that may be attributed to social influence. The effect of social influence $SI_{shuffled}$ may be determined from the following relationship:

$$SI_{shuffled} = \frac{A_{SI}'}{A}$$

If $SI_{original} > SI_{shuffled}$ then it may be concluded, in at least some examples, that some level of social influence may be present. The effect of social influence may be monitored at any specific time $t \in [0,T]$ (or if a specific number of activations has occurred) by comparing, for example, a number of activations that are due to social influence as opposed to random activations by the following relationship:

$$SI_{t \in [0,T]}^t = SI_{original}^t - SI_{shuffled}^t$$

The above relation suggests that a timing of activations is not independent of but rather is affected by the number of already activated neighboring nodes. Suitable variations of this shuffle test may be used to distinguish social influence from random adoption. In an electronic social network, activation of nodes may be based on actual observations. The shuffle test may therefore potentially be applied to quantify social influence.

As an example of assessing social influence based at least in part on application of a shuffle test, an electronic social network hosting billions of photos was processed with respect to adoption of geotagging photos. To increase likelihood that users included a large number of users that adopted geotagging, a seed set of 100 active geotagging users of the social network, their contacts, and their contacts' contacts were included. The final set included 525,000 users represented, for example, by respective nodes and 47 million directed edges representing social connections between nodes. From these users, 120,000 users were identified to have used geotagging at least once, termed here geotaggers. FIG. 6 provides descriptive information about network structure for users in the set and FIG. 7 for geotaggers. Moreover, FIG. 8 provides information about the distribution of photos in the electronic social network per geotagger. The example set comprises approximately 13 million geotagged photos.

Figure 9:
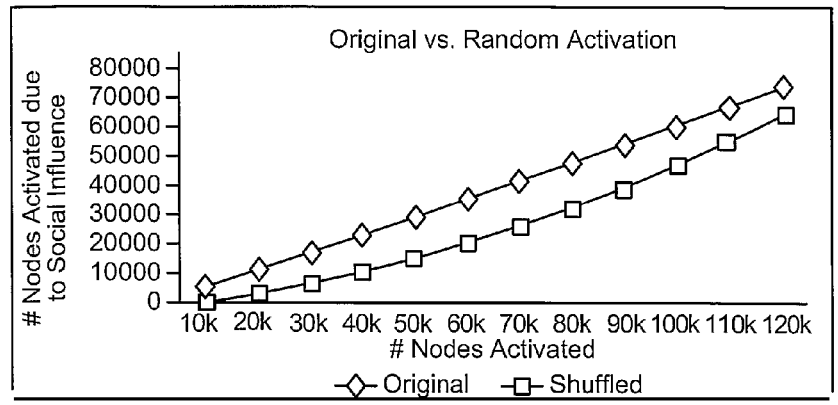
FIGS. 9-16(*b*) depict graphs showing application of a shuffle test to a communications network.

The shuffle test was performed on the set to observe diffusion of geotagging (e.g., node activations) for original and shuffled timestamps provided respectively by operation 1 and operation 2 discussed previously. FIG. 9 shows that for a fixed number of activations, the number of nodes activated at a given timestamp is larger in the original timestamps than the shuffled timestamps. Therefore, adoption of geotagging may be attributed to social influence of users in this particular example.

Figure 10:
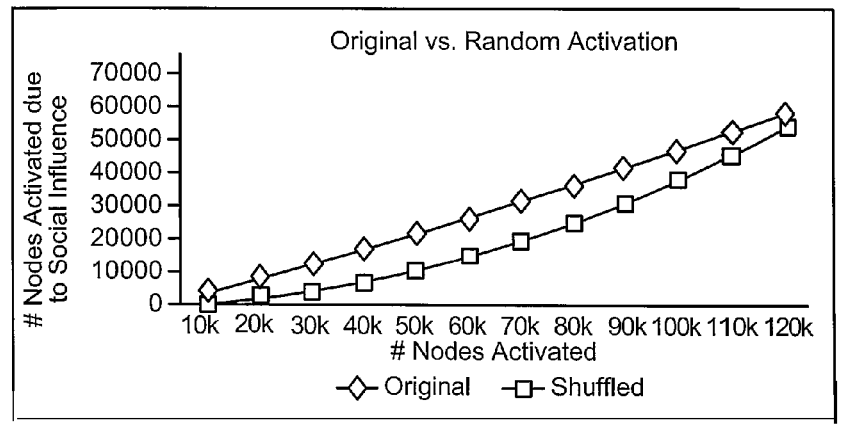

In the above example, the definition of an activation of a node as a result of social influence has been constrained to having at least one active neighbor at the time of activation. This definition of social influence may be varied by restricting the definition of social influence to having two or more active neighbors at the time of activation. FIG. 10 shows the results of the shuffle test performed with this more restrictive definition where at least two neighboring nodes are already active at the time of activation of a given node. This more restricted definition results, in this particular example, in a smaller percentage of activations attributed to social influence (almost 60,000 in 120,000 as opposed to 78,000 in 120,000 in the previous case).

Figure 11:
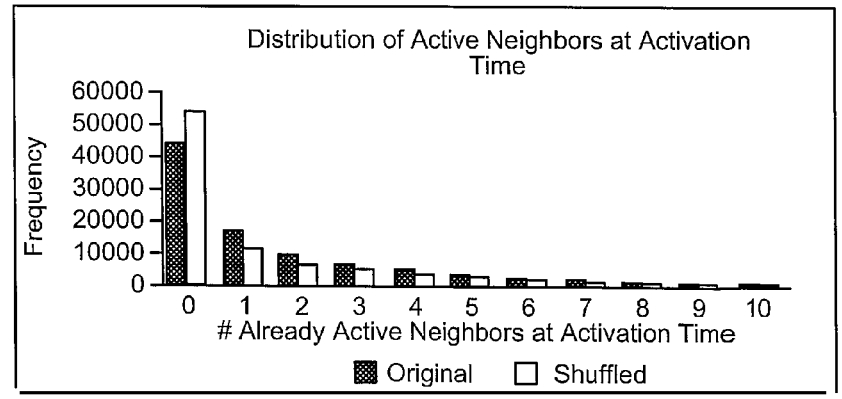

FIG. 11 shows the distribution of the number of already active nodes at the time that a node is activated for both original and shuffled timestamps. Note that in the case of shuffled timestamps the number of nodes that have no other active neighbor at the time of activation (the initiators) is larger than that of the original timestamps. Hence, initiators are distributed more uniformly in the graph of FIG. 11 in the case of the shuffled timestamps than in the original timestamps. This provides an indication that activations are not random. Moreover, for subsequent definitions (e.g., at least 1, at least 2, at least 3, . . . , at least 10 active nodes at the time of activation) the number of active neighbors is larger in the case of the original than in the shuffled scenario. Therefore, even for more restricted definitions of social influence, there exist activations that may be attributed to social influence as opposed to random activations.

Figure 12:
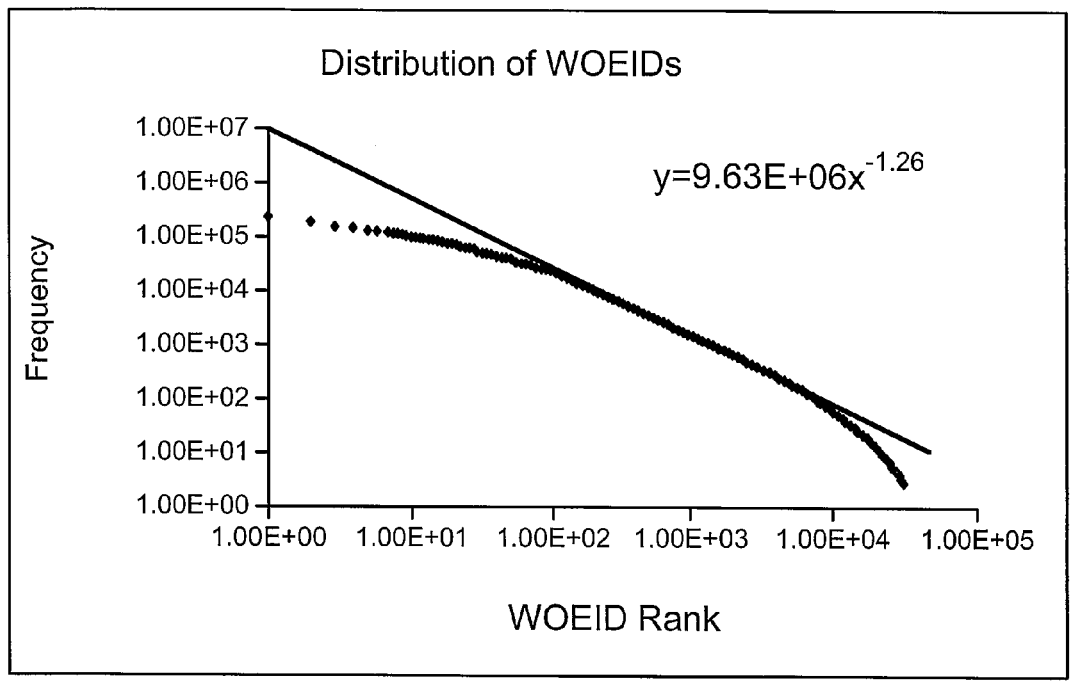

In another example, this system was examined to determine whether more credible users are also more influential users as indicated by social influence. Different users may be more or less accurate at performing a particular activity such as geotagging. Such users may also be more or less accurate at different types of geotagging, such as geotagging at different location types or levels. For example, some users may be highly accurate at identifying points of interest (e.g., monuments, landmarks, etc.), while other users may be highly accurate at identifying locations at a city level or a town level. Still other users may be less accurate and hence less reliable to identify some locations, except, for example, at a country level. Accordingly, a user's credibility may comprise a credibility vector. FIG. 12 plots on a log-log scale the distribution of geographic location identifiers representing a number of times a given geographic location identifier has been identified as a target location.

Figure 13:
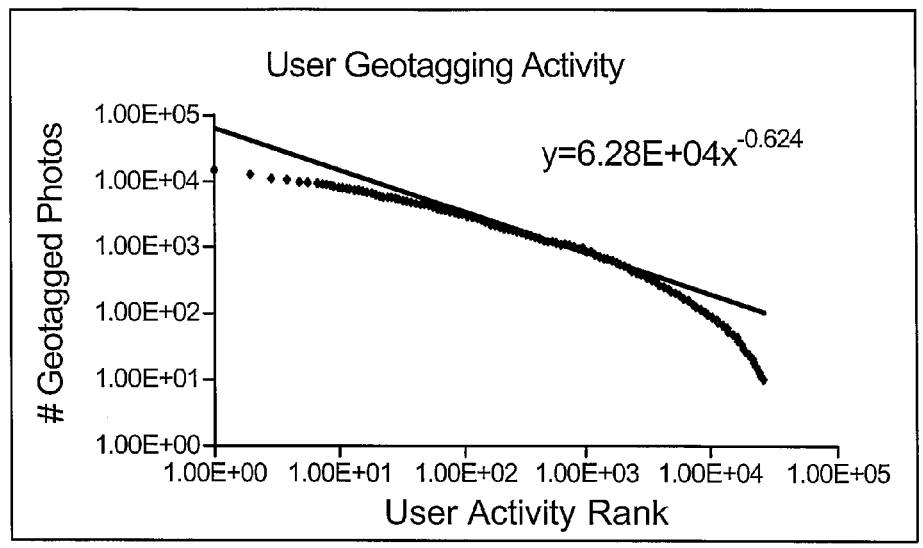
Figure 14:
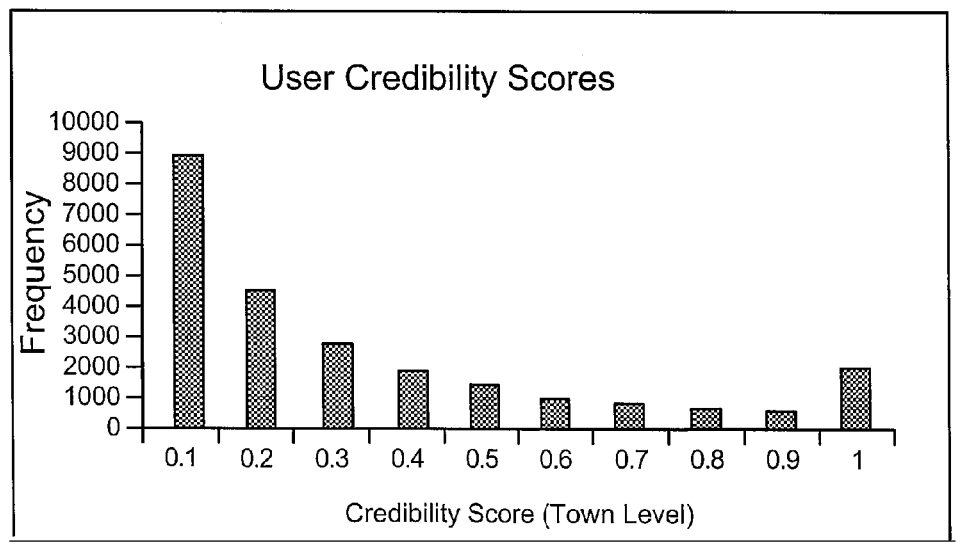

FIG. 13 plots in a log-log scale the distribution of user geotagging activity for the set. The distribution may be modeled quite accurately, for example, by a power law, and the probability f(x) of a user to have geotagged x number of photos is proportional, in this example, to $x^{-0.624}$. The x-axis represents the rank of a user, taking values from 1 to approximately 25,000, if users are ordered by their activity from the most to the least active users. FIG. 14 shows a histogram of credibility scores for $\lambda=0.75$. As previously described, λ may comprise a parameter that affects selectivity of hits and misses in a geotagging process. The value of 0.75 was selected for λ to create better fluctuations in scores of users (not all 1s, not all 0s, etc.). A majority of users, it is noted, have relatively low credibility scores.

It may be possible to assess potential social influence of a user relative to a set of users of a network, such as a communication network, over a time period. An example process 1800 of FIG. 17 provides details of a recursive implementation for evaluating social influence in a finite number of operations. Process 1800 takes a set of users U, a graph G and the activation times of users A in the monitoring period [0,T], and returns the number of users that have potentially been influenced by the set of users U. Process 1800 is one example of a tool that may be used to assess and compare social influence of varying sets of users.

One may hypothesize that users who are more active are more influential. This may stand to reason because users who are more active upload more photos, and provide geotags for more photos. They may be considered "experts" of a sort, in a system of user-generated content. From a set of 25,000 users identified, two types of users were defined: more active users (at least 200 photos geotagged) and less active users (fewer than 20 photos geotagged). For activity level, a pair of sets may be formed comprising 1000 random users and compare their potential social influence using process 1800. Assuming increased visibility, such as through notification mechanisms made available by a communication network, active users, because they generate more content, are viewed by more people.

Figures 15A, 15B:
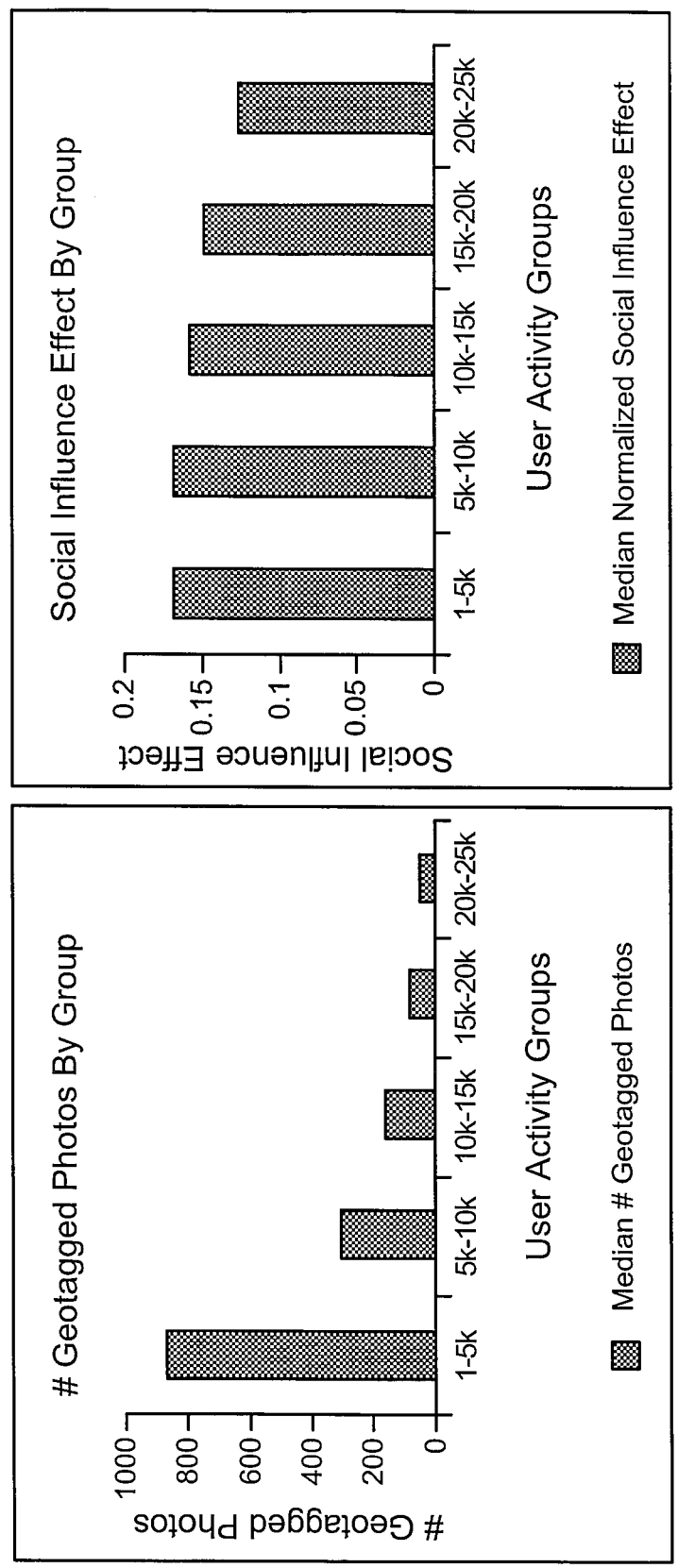

FIGS. 15(*a*) and 15(*b*) show that more active users are more influential, in terms of encouraging people to adopt geotagging. To establish this normality tests were run using the Shapiro-Wilk method, to show that the samples in each group do not follow a normal distribution. To compare the 5 different groups, a method that does not assume a normal population of samples, the Kruskal-Wallis test, was employed for a selected significance level alpha=0.05. This test is a non-parametric method for testing equality of population medians among groups. If the null hypothesis is rejected by the Kruskal-Wallis test, post-hoc analysis may be applied to identify which of the groups differ. Therefore, for the various cases, one may formally define the following hypotheses:

H0: The samples are not significantly different

Ha: The samples do not come from the same population

For the case of FIG. 15(*b*), the Kruskal-Wallis test showed that the samples do not come from the same population, thus rejecting the null hypothesis H0. Post-hoc analysis revealed that all groups were significantly different with each other. This supports the notion that more active users are more influential in the social network. In addition, an effect may be observed of increasing social influence as the number of users that have adopted a technology increases. Eventually the average number of neighbors that have adopted the technology also may also increase.

A measure of user credibility using distance from a target value was discussed previously: a user is more accurate as a geotagger if the user consistently places photos close to actual location. However, likewise, as previously discussed, user credibility may relate not only to how accurate a user is, but how accurate the user is perceived to be by other users. Thus, there may be an interplay between user influence and accuracy as represented by user credibility. More credible users may therefore be more influential.

Figures 16A, 16B:
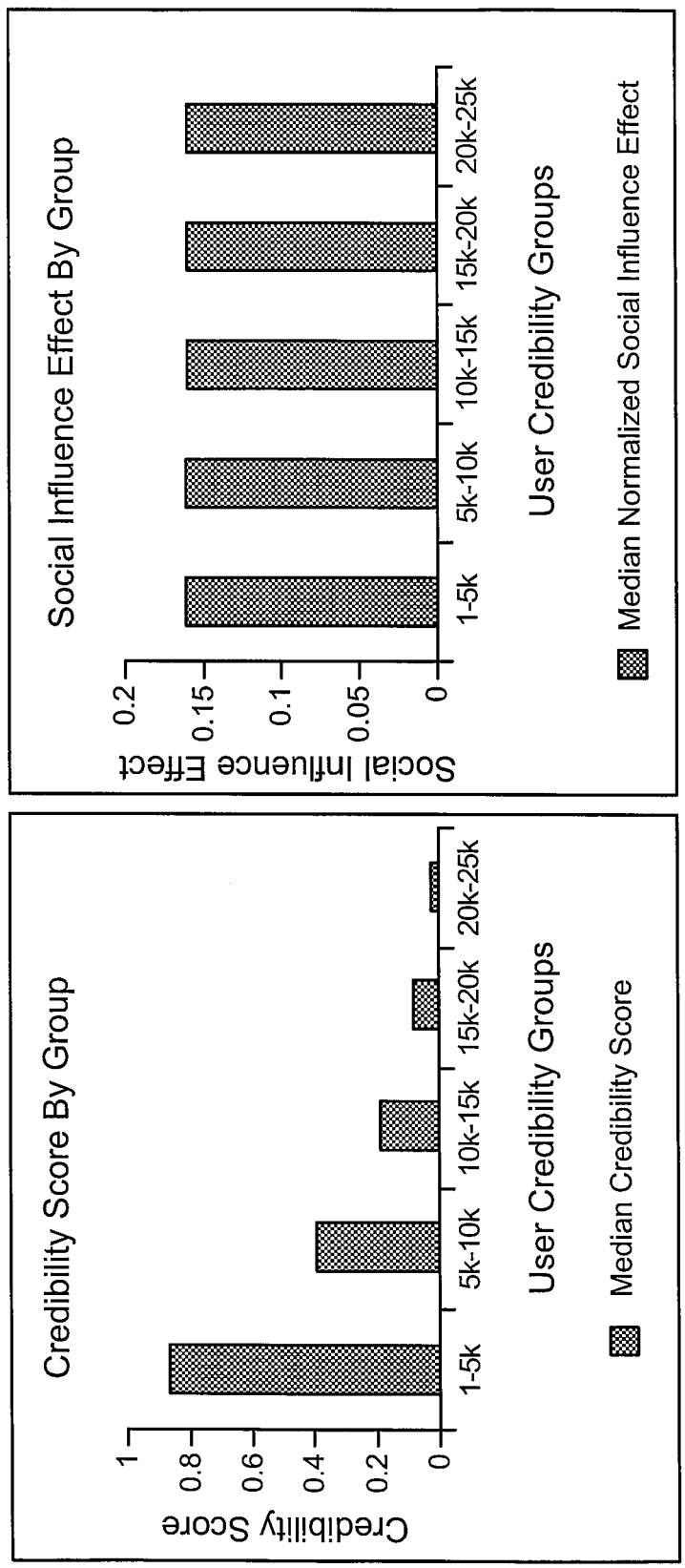

Sets of users may be defined for users that are more credible and users that are less credible. Potential social influence of these sets of users may be compared using process 1800, for example. To reduce or eliminate the effect of frequency with which users geotag photos, the defined sets may comprise users with similar geotagging activity as measured, for example, by geotagging frequency. Two subsets of users may be defined to compare a subset of 10% more credible users and a subset of 10% less credible users. One may expect, for example, that users with higher credibility scores—that is, users who are more accurate—may be more likely to be more influential. But as demonstrated by FIGS. 16(*a*) and 16(*b*), this may not always be the case. For the case of FIG. 16(*b*), the Kruskal-Wallis test showed that the samples come from the same population, thus accepting the null hypothesis H0. This supports the notion that being more credible does not necessarily make a user more influential in the social network. That is, a user may perform certain actions, such as geotagging, if that user sees another user do so, but whether or not the other user was accurate may not necessarily factor into a user's decision to also do so.

It will, of course, also be understood that, although particular embodiments have just been described, claimed subject matter is not limited in scope to a particular embodiment or implementation. For example, one embodiment may be in hardware, such as implemented on a device or combination of devices, as previously described, for example. Likewise, although claimed subject matter is not limited in scope in this respect, one embodiment may comprise one or more articles, such as a storage medium or storage media, for example, that may have stored thereon instructions executable by a specific or special purpose system or apparatus. As one potential example, a specific or special purpose computing platform may include one or more processing units or processors, one or more input/output devices, such as a display, a keyboard or a mouse, or one or more memories, such as static random access memory, dynamic random access memory, flash memory, or a hard drive, although, again, claimed subject matter is not limited in scope to this example.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice-versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

In the preceding description, various aspects of claimed subject matter have been described. For purposes of explanation, systems or configurations were set forth to provide an understanding of claimed subject matter. However, claimed subject matter may be practiced without those specific details. In other instances, well-known features were omitted or simplified so as not to obscure claimed subject matter. While certain features have been illustrated or described herein, many modifications, substitutions, changes or equivalents will now occur to those skilled in the art. It is, therefore, to be understood that the appended claims are intended to cover all such modifications or changes as fall within the true spirit of claimed subject matter.

What is claimed is:

1. A method, comprising:
   receiving an indication of geographic location;
   associating the indication of geographic location with one or more electronic media or content items via a special purpose computing system;
   identifying a set of other electronic media or content items comprising one or more signal sample values indicating a geographic location based, at least in part, on geographic proximity of the geographic location indicated by the one or more signal sample values to the indication of geographic location associated with the one or more electronic media or content items;
   determining for the one or more electronic media or content items, via the special purpose computing system, one or more location tags comprising one or more binary digital signals comprising a text string indicating a geographic location;
   wherein determining the one or more location tags comprises identifying a plurality of location tags comprising a text string associated with the set of other electronic media or content items, and further wherein the one or more location tags are determined at least in part in accordance with one or more user credibility signal sample values and the identified plurality of location tags, wherein the one or more user credibility signal sample values indicate a user reputation with respect to accuracy in evaluating a characteristic of the set of other electronic media or content items; and
   associating the one or more location tags with the one or more electronic media or content items;
   wherein the plurality of location tags associated with the set of other electronic media or content items comprises a plurality of categories and wherein the one or more location tags are determined at least in part in accordance with one or more user credibility signal sample values for a first category of the plurality of categories, and wherein the user credibility signal sample values for the first category of the plurality of categories are based, at least in part, on one or more deviation signal sample values corresponding to a distance between a target geographic location associated with one or more tags in the first category of the plurality of categories and an indication of geographic location associated with the set of other electronic media or content items.

2. The method of claim 1, wherein the determining comprises filtering the plurality of location tags associated with the set of other electronic media or content items at least in part in accordance with the one or more user credibility signal sample values.

3. The method of claim 2, wherein the filtering comprises filtering the plurality of location tags based at least in part on a threshold user credibility signal sample value.

4. The method of claim 1, wherein the user credibility signal sample values comprise a vector of user credibility signal sample values; the vector comprising user credibility signal sample values for the first category of the plurality of categories and user credibility signal sample values for a second category of the plurality of categories.

5. The method of claim 1, wherein the user credibility signal sample values comprises a filtered combination of user credibility signal sample values.

6. The method of claim 5, wherein the filtered combination comprises a statistical mean.

7. The method of claim 1, further comprising:
   determining a target geographic location corresponding to the one or more location tags;
   determining one or more deviation signal sample values based at least in part on the target geographic location and the indication of geographic location associated with the one or more electronic media or content items, the one or more deviation signal sample values comprising a distance between the target geographic location and the indication of geographic location;
   determining deviation signal sample values corresponding to a plurality of deviations of the set of other electronic media or content items based, at least in part, on a distance between a target geographic location for one or more of the plurality of location tags associated with the set of other electronic media or content items and the geographic location indicated by the one or more signal sample values associated with the set of other electronic media or content items;
   determining a filtered combination of the plurality of deviations based at least in part on an average of the determined deviation signal sample values corresponding to the plurality of deviations of the set of other electronic media or content items; and
   determining the one or more user credibility signal sample values based, at least in part, on a comparison of the determined one or more deviation signal sample values and the filtered combination of the plurality of deviations associated with the set of other electronic media or content items.

8. An apparatus comprising: a special purpose computing system comprising a processor; the special purpose computing system including a capability to:
   receive an indication of geographic location;
   associate, using the processor, the indication of geographic location with one or more electronic media or content items;
   identify, using the processor, a set of other electronic media or content items to comprise one or more signal sample values to indicate a geographic location to be based, at least in part, on geographic proximity of the geographic location to be indicated by the one or more signal sample values to the indication of geographic location to be associated with the one or more electronic media or content items;
   determine, for the one or more electronic media or content items, using the processor, one or more location tags to comprise one or more binary digital signals to comprise a text string to indicate a geographic location;
   wherein to determine the one or more location tags to comprise an identification of a plurality of location tags to comprise a text string to be associated with the set of other electronic media or content items, and further wherein the special purpose computing system further to determine the one or more location tags at least in part in accordance with one or more user credibility signal sample values and the identified plurality of location tags, wherein the one or more user credibility signal sample values are to indicate a user reputation with respect to accuracy in evaluating a characteristic of the set of other electronic media or content items; and associate, using the processor, the one or more location tags with the one or more electronic media or content items; and wherein the plurality of location tags to be associated with the set of other electronic media or content items to comprise a plurality of categories and to determine the one or more location tags is at least in part in accordance with a first one of the one or more user credibility signal sample values for a first category of the plurality of categories, and wherein the user credibility signal sample values for the first category of the plurality of categories are to be based, at least in part, on one or more deviation signal sample values to correspond to a distance between a target geographic location to be associated with one or more tags in the first category of the plurality of categories and an indication of geographic location to be associated with the set of other electronic media or content items.

9. The apparatus of claim 8, wherein the special purpose computing system further to filter the plurality of location tags to be associated with the set of other electronic media or content items at least in part in accordance with the one or more user credibility signal sample values.

10. The apparatus of claim 9, wherein the special purpose computing system is further to filter the plurality of location tags to be based at least in part on a threshold user credibility signal sample value.

11. The apparatus of 10, wherein the one or more user credibility signal sample values to comprise a vector of user credibility signal sample values; the vector to comprise the first one of the one or more user credibility signal sample values for the first category of the plurality of different categories and a second one of the user credibility signal sample values for a second category of the plurality of categories.

12. The apparatus of claim 8, wherein the special purpose computing system further includes a capability to:

determine a target geographic location to correspond to the one or more location tags;

determine one or more deviation signal sample values to be based at least in part on the target geographic location and the indication of geographic location to be associated with the one or more electronic media or content items, the one or more deviation signal ample values to comprise a distance between the target geographic location and the indication of geographic location;

determine deviation signal sample values to correspond to a plurality of deviations of the set of other electronic media or content items to be based, at least in part, on a distance between a target geographic location for one or more of the plurality of location tags to be associated with the set of other electronic media or content items and an indication of geographic location also to be associated with the set of other electronic media or content items;

determine a filtered combination of the plurality of deviations to be based at least in part on an average of the determined deviation signal sample values to correspond to the plurality of deviations of the set of other electronic media or content items; and determine the one or more user credibility signal sample values to be based, at least in part, on a comparison of the determined one or more deviation signal sample values and the filtered combination of the plurality of deviations to be associated with the set of other electronic media or content items.

13. An article comprising: a non-transitory storage medium having stored thereon instructions executable by a special purpose computing system; the instructions executable to:

receive an indication of geographic location;

associate the indication of geographic location with one or more electronic media or content items via the special purpose computing system;

identify a set of other electronic media or content items to comprise one or more signal sample values to indicate a geographic location to be based, at least in part, on geographic proximity of the geographic location to be indicated by the one or more signal sample values to the indication of geographic location to be associated with the one or more electronic media or content items;

determine, for the one or more electronic media or content items, one or more location tags to comprise one or more binary digital signals to comprise a text string to indicate a geographic location;

wherein the instructions further executable to identify a plurality of location tags to comprise a text string to be associated with the set of other electronic media or content items, and further wherein to the instructions are executable are to determine the one or more location tags at least in part in accordance with one or more user credibility signal sample values and the identified plurality of location tags, wherein the one or more user credibility signal sample values are to indicate a user reputation with respect to accuracy in evaluating a characteristic of the set of other electronic media or content items; and associate the one or more location tags with the one or more electronic media or content items; and wherein the plurality of location tags to be associated with the set of other electronic media or content items are to comprise a plurality of categories and wherein the one or more location tags are to be determined at least in part in accordance with one or more user credibility signal sample values for a first category of the plurality of categories, and wherein the user credibility signal sample values for the first category of the plurality of categories are to be based, at least in part, on one or more deviation signal sample values to correspond to a distance between a target geographic location to be associated with one or more tags in the first category of the plurality of categories and an indication of geographic location to be associated with the set of other electronic media or content items.

14. The article of claim 13, wherein the instructions further to filter the plurality of location tags to be associated with the set of other electronic media or content items at least in part in accordance with the one or more user credibility signal sample values.

15. The article of claim 14, wherein the instructions to filter are further to filter the plurality of location tags to be based at least in part on a threshold user credibility signal sample value.

16. The article of 13, wherein the plurality of location tags to be associated with the set of other electronic media or content items to comprise a plurality of categories and wherein to determine the one or more location tags is at least in part in accordance with a first one of the one or more user credibility signal sample values for a first category of the plurality of categories.

17. The article of 16, wherein the one or more user credibility signal sample values to comprise a vector of user credibility signal sample values; the vector to comprise the first one of the user credibility signal sample values for the first category of the plurality of categories and a second one of the one or more user credibility signal sample values for a second category of the plurality of categories.

* * * * *